United States Patent [19]
Takemoto et al.

[11] Patent Number: 5,611,534
[45] Date of Patent: Mar. 18, 1997

[54] METAL SUBSTANCE DETECTION SYSTEM FOR DETECTING THE PRESENCE POSITION OF A METAL SUBSTANCE

[75] Inventors: Takatoshi Takemoto; Kazunari Kawashima, both of Tokyo; Shigeru Handa, Hachioji, all of Japan

[73] Assignee: Kabushiki Kaisha Ace Denken, Tokyo, Japan

[21] Appl. No.: 307,784

[22] PCT Filed: Apr. 16, 1993

[86] PCT No.: PCT/JP93/00491

§ 371 Date: Oct. 17, 1994

§ 102(e) Date: Oct. 17, 1994

[87] PCT Pub. No.: WO93/21495

PCT Pub. Date: Oct. 28, 1995

[30] Foreign Application Priority Data

Apr. 16, 1992 [JP] Japan .................................. 4-096801
Apr. 17, 1992 [JP] Japan .................................. 4-098237
Apr. 17, 1992 [JP] Japan .................................. 4-098238

[51] Int. Cl.$^6$ ...................................................... A63F 7/02
[52] U.S. Cl. .................................. 273/121 B; 273/121 A
[58] Field of Search ........................... 273/121 B, 118 R, 273/118 A, 119 R, 112 A, 121 A, 237, 238, 239; 364/410; 324/219, 207.11, 207.17; 463/25

[56] References Cited

U.S. PATENT DOCUMENTS

| | | | |
|---|---|---|---|
| 3,760,404 | 9/1973 | Khlebutin | 273/238 |
| 4,492,581 | 1/1985 | Arai et al. | 273/238 |
| 5,013,047 | 5/1991 | Schwab | 273/238 |
| 5,082,286 | 1/1992 | Ryan et al. | 273/238 |
| 5,129,654 | 7/1992 | Bogner | 273/237 |
| 5,405,143 | 4/1995 | Takemoto et al. | 273/121 B |

FOREIGN PATENT DOCUMENTS

| | | |
|---|---|---|
| 52-30456 | 3/1977 | Japan . |
| 58-182370 | 10/1983 | Japan . |
| 62-154752 | 10/1987 | Japan . |
| 63-44518 | 3/1988 | Japan . |
| 63-305720 | 12/1988 | Japan . |
| 2-279186 | 11/1990 | Japan . |
| 4-122375 | 4/1992 | Japan . |
| 9204954 | 4/1992 | WIPO .................. 273/121 B |

*Primary Examiner*—Jessica Harrison
*Assistant Examiner*—Michael O'Neill
*Attorney, Agent, or Firm*—Lowe, Price, LeBlanc & Becker

[57] ABSTRACT

A metal substance detection system which comprises a matrix sensor (20) having a group of transmission lines (22) and a group of reception lines (26) and a signal processing system (170) which drives the matrix sensor for detecting the presence and position of a metal substance. The signal processing system scans the transmission line group and the reception line group; it sends a signal current to the former and receives a reception signal from the latter for detecting the presence and position of a metal substance based on the reception signal. If some lines of either the transmission line group or the reception line group are prespecified as unscanned lines, the signal processing system skips the lines of the corresponding line group specified as the unscanned lines.

34 Claims, 19 Drawing Sheets

METAL SUBSTANCE DETECTION SYSTEM FOR DETECTING THE PRESENCE POSITION OF A METAL SUBSTANCE

FIELD OF THE INVENTION

This invention relates to a metal substance detection system for detecting the presence position of a metal substance and in particular to a metal substance detection system for sensing the presence or absence of a metal substance and if it exists, sensing the presence position thereof by using a matrix sensor which comprises a matrix of sensing regions provided by a plurality of transmission lines and a plurality of reception lines.

BACKGROUND OF THE INVENTION

It may become necessary to detect the presence position of a metal substance in a determined area, particularly in a plane area, for example, to detect a move path of a metal substance moving in a plane area or when metal substances distribute in one area, to detect their distribution pattern. A specific example of the former is to detect a move path of game play media in a gaming machine.

With some gaming machines, a player moves a metal substance, such as a metal ball, in a specific space set in the gaming machine and may or may not win the play depending on the destination of the metal ball. Pinball machines are typical of such gaming machines; with a pinball machine, a player plays a game by dropping a metal ball called a "pinball" in a space sandwiched between parallel planes in which a large number of obstacles are located.

A general pinball machine has a base board for providing a space required to move pinballs, a glass plate spaced from the base board at a given interval to cover the base board, and a propelling mechanism for propelling pinballs in the space provided by the base board and the glass plate. The pinball machine is set up so that the base board becomes substantially parallel to the vertical direction. The base board is formed with a plurality of safe holes for the player to enter a pinball in for a winning game play through which the pinball is discharged from the base board and an out hole into which pinballs not entered in the safe holes are finally collected for discharging the pinballs from the base board.

A large number of pins (nails) are set up substantially vertical to the base board in a state in which they project from the base board as long as the diameter of a pinball as obstacles with which pinballs dropping along the base board frequently collide for causing their motion direction to fluctuate. The pins are located on the base board as a distribution determined so as to guide pinballs colliding with the pins toward or away from the safe holes while causing the motion directions of the pinballs to fluctuate.

By the way, winning game play conditions at each pinball machine need to be managed at pinball parlors having a large number of such pinball machines. That is, personnel of the pinball parlor need to find machines having an unbalanced or abnormal path of pinballs for replacing or repairing them. For example, if machines which are easy for players to win game plays are left as they are, the pinball parlor suffers a great administration loss; such machines need to be found. In contrast, if the pinball parlor contains machines which are abnormally hard for players to win game plays, the pinball parlor will lose their customers; such machines need to be found. Also, while players play games, personnel of the pinball parlor need to find some players performing such illegal operation as guiding pinballs with a magnet, etc.

A conventional metal substance detection system for such purposes is described in Japanese Patent Laid-Open No.Hei 2-279186.

In the gazette, a pinball detection system is disclosed. The detection system has a metal sensor called a sensing matrix comprising a transmission coil row group in which transmission coil strings with continuous transmission units like open rings are arranged in one direction and a reception coil group in which reception coil strings with continuous reception units like open rings inductively coupling with the transmission units are arranged in a direction crossing the transmission coil row group. The metal sensor is connected to a controller for sensing whether or not a metal substance exists in each overlap of the transmission and reception units.

The metal sensor can be attached to a glass plate covering a base board of a pinball machine for detecting the presence position of a pinball on the base board of the pinball machine.

By the way, a large number of transmission and reception coil strings need to be installed to raise the detection accuracy. However, they comprise coils like open rings, thus have a complicated structure, and the wiring density cannot be raised.

In contrast, the present applicant proposed a sensor comprising transmission lines and reception lines in place of coil strings in the specification of the application in Japan (Japanese Patent Application No. Hei 2-244898, Japanese Patent Laid-Open No. Hei 4-122375, laid open to public inspection on Apr. 22, 1992: which was open after the priority date of the present application and not prior document for the present application), wherein the sensing matrix comprises a plurality of parallel turned transmission lines installed on one face of a wiring board and a plurality of parallel turned reception lines installed on the opposed face of the wiring board crossing the transmission lines so that the reception lines are electro-magnetically coupled with the transmission lines. The transmission lines and reception lines of the sensing matrix are connected to a transmission circuit and reception circuit of the controller, a signal current is made to flow into the transmission lines in sequence, and current induced by the signal current is taken out for each reception line in sequence, whereby the presence or absence of a metal substance is detected from the induced current detected at the reception circuit and the position of the metal substance can be detected from a combination of the transmission line on which the signal current flows and the reception lines on which the reduced current is received.

By the Way, when such a metal substance detection system has a wide detection area and requires accuracy, it comprises a large number of transmission and reception lines. Thus, when detecting a metal substance, the detection system scans each of a large number of transmission and reception lines and it takes time to detect the metal substance. Particularly, when the target changes as it moves as in gaming machines, position accuracy will be degraded if the target is not detected quickly.

DISCLOSURE OF THE INVENTION

It is therefore an object of the invention to provide a metal substance detection system which can detect the presence position of a metal substance accurately and rapidly.

To the end, according to one form of the invention, there is provided a metal substance detection system comprising a matrix sensor having a detection area spreading like a plane and a signal processing system which drives the matrix sensor for sensing the presence of a metal substance and detecting the position thereof.

The matrix sensor has a group of transmission lines, a group of reception lines, and a board for supporting them. The transmission line group and the reception line group are placed on the board so as to cross each other. Specifically, for example, the transmission lines are arranged at given intervals in a row direction and the reception lines are arranged at given intervals in a column direction. The transmission lines and the reception lines are placed in such a manner to provide the crossinng portions of the transmission lines and the reception lines like a matrix as sensing regions.

The signal processing system comprises:

a transmission circuit for scanning the transmission lines in sequence and sending a signal current to them;

a reception circuit for scanning the reception lines in sequence and reading their reception signals in sequence; and a signal processor for controlling operation of the transmission circuit and the reception circuit and receiving a reception signal from the reception circuit for detecting presence or absence of a metal substance and a position at which the metal substance is sensed.

The signal processor can comprise:

an A/D converter for converting the reception signals input from the reception circuit into digital data;

a memory for storing the reception signals converted into the digital data in relation to the intersections; and an information processor for reading the reception signals stored in the memory for detecting presence or absence of a metal substance and a presence position thereof. The memory can be a dual port RAM (random access memory) into which data can be written from the A/D converter independently of read operation and from which data can be read from the information processor independently of the write operation.

The signal processor can further include sequence control means for generating and outputting operation timing signals for controlling operation of the transmission and reception circuits, operation of the A/D converter, and memory addresses.

The sequence control means can generate scan control signals for scanning the transmission lines and the reception lines and output the signals to the transmission and reception circuits and the memory. The sequence control means is responsive to specification of unscanned lines for outputting a signal for skipping the unscanned lines in scanning to either the transmission circuit or the reception circuit corresponding to the specification.

The signal processor can further include a storage medium that can be mounted and demounted and an interface section on which the storage medium is mounted. In this case, the storage medium can previously store information indicating the intersections to be monitored.

The sequence control means can output a first timing signal to one of the transmission and reception circuits for scanning the lines in sequence and each time one scanning of the line group is complete, can output a second timing signal to the other for switching the current scanning to the next line.

The line group scanned in response to the second timing signal can be specified as the unscanned lines, for example.

Further, the sequence control means can send the first timing signal to the reception circuit and the second timing signal to the transmission circuit.

The signal processor can further include means for storing scan information previously specifying unscanned lines. The scan information storage means is made of a card-type storage medium, for example.

The signal processor can have an information processor for reading scan information from the scan information storage means and setting the number of one or more contiguous lines to be skipped in scanning in the sequence control means.

The sequence control means can comprise a reception line switch pulse generating circuit for generating the first timing signal, a transmission line switch pulse generating circuit for generating the second timing signal, and an interrupt timing circuit for dividing a first timing pulse for generating an interrupt pulse having a pulse duration shorter than a period in which one scanning of the line group scanned in response to the first timing pulse is complete.

The information processor can be synchronized with an interrupt pulse of the interrupt timing circuit before completion of one scanning of the line group scanned in response to the first timing pulse for setting a skip count for the line to be scanned in response to a second timing pulse and its subsequent lines in the sequence control means.

The signal processor has an information processor for determining whether or not a metal substance exists from the signal received at the reception circuit and detecting a position at which the metal substance is sensed, based on information indicating a transmission line scanning position of the transmission circuit and information indicating a reception line scanning position of the reception circuit.

According to another form of the invention, there is provided a metal substance detection system comprising a matrix sensor having a detection area spreading like a plane and a signal processing system for driving the matrix sensor for detecting presence of a metal substance and a position thereof. The signal processing system comprises:

a transmission circuit for scanning the transmission lines in sequence and sending a signal current to them;

a reception circuit for scanning the reception lines in sequence and reading their reception signals in sequence; and a signal processor for outputting control signals to the transmission and reception circuits for causing the circuits to scan the transmission lines and the reception lines respectively, determining whether or not a metal substance exists from the signal received at the reception circuit, and detecting a position at which the metal substance is sensed, based on information indicating a transmission line scanning position of the transmission circuit and information indicating a reception line scanning position of the reception circuit.

The signal processor has an information processor for determining whether or not a metal substance exists from the signal received at the reception circuit and detecting a position at which the metal substance is sensed, based on information indicating a transmission line scanning position of the transmission circuit and information indicating a reception line scanning position of the reception circuit.

The signal processor can further include a data converter section for comparing a reception signal from the reception circuit with reference data to find a change, at a stage preceding the information processor.

The data converter section can comprise a memory for storing the reference data and an operational circuit for finding a difference between the reference data stored in the memory and the reception signal from the reception circuit.

According to a further form of the invention, there is provided a metal substance detection system comprising a matrix sensor having a detection area spreading like a plane and a signal processing system for driving the matrix sensor for detecting presence of a metal substance and a position thereof. The matrix sensor has a transmission line group consisting of parallel lines, a reception line group consisting of parallel lines, and a board for supporting them. The transmission line group and the reception line group cross each other with intersections of the transmission and reception lines being arranged like a matrix on the board.

The matrix sensor has the transmission lines and the reception lines forming their intersections at predetermined detection positions.

BEST MODE FOR CARRYING OUT THE INVENTION

Referring now to the accompanying drawings, there are shown preferred embodiments of the invention.

Prior to the description of the embodiments, pinball machines to which the embodiments of the invention are applied will be discussed with reference to FIG. 3.

Figure 3:
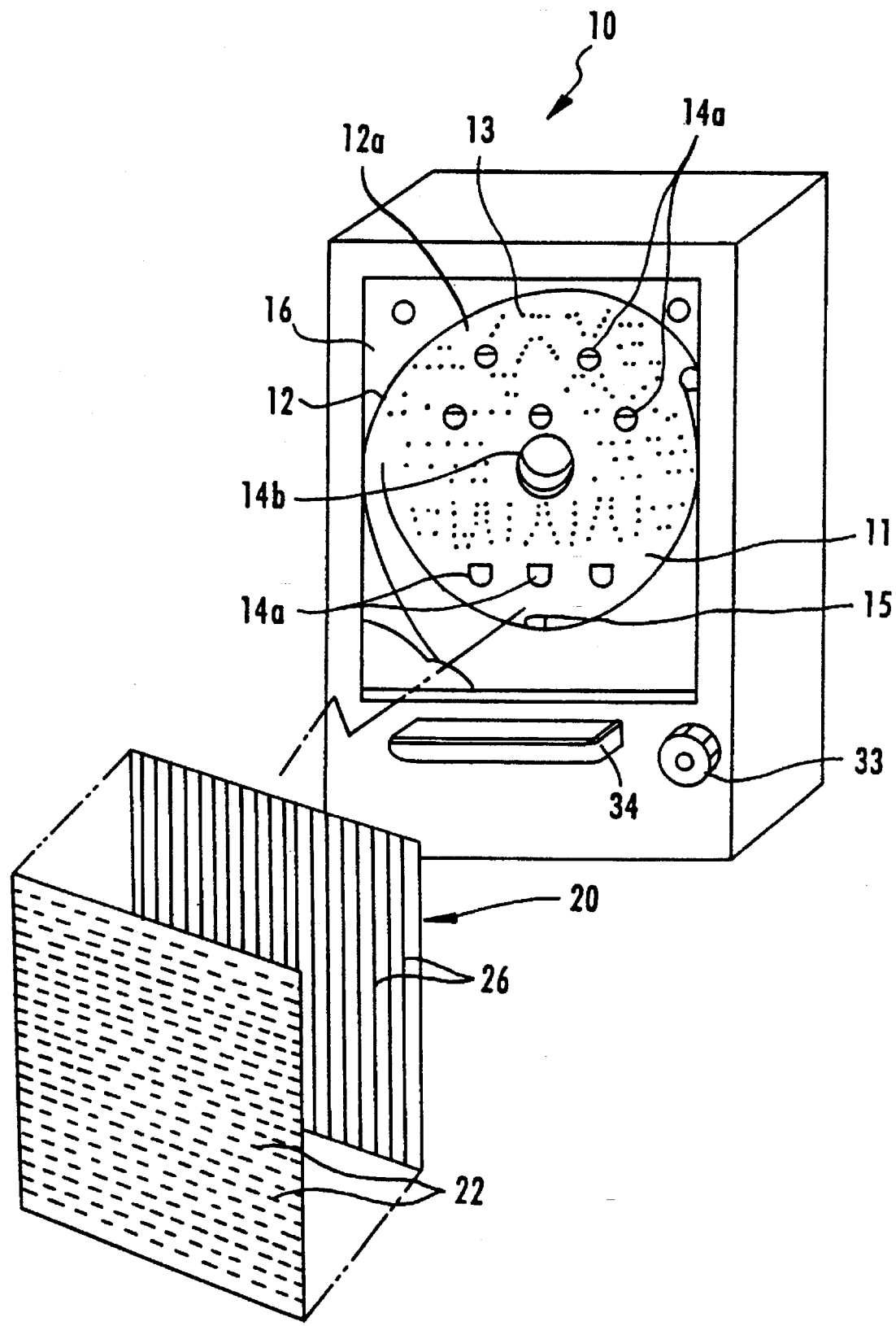
FIG. 3 is a perspective view showing an example of a pinball machine to which a metal substance detection system of the invention is applied.

The pinball machine shown in FIG. 3 has a base board 11 for providing a space required to move pinballs, a surface glass substance 16 spaced from the base board 11 at a given interval to cover the base board, and a propelling mechanism for propelling pinballs in the space provided by the base board 11 and the surface glass substance 16. The pinball machine is set up so that the base board 11 becomes substantially parallel to the vertical direction.

The base board 11 is provided with a guide rail 12. The inner area of the base board 11 surrounded by the guide rail 12 provides a gaming area 12a. The guide rail 12 guides a pinball propelled by the propelling mechanism along the rail to the upper position (upstream part) in the vertical direction of the gaming area 12a.

The gaming area 12a is formed with a plurality of safe holes 14a for the player to enter a pinball in for a winning game play through which the pinball is discharged from the base board 11, a winning game play effect device 14b being located at the center of the base board from upstream to downstream for providing a special winning game play condition, and an out hole 15 into which pinballs not entered in the safe holes 14a are finally collected for discharging the pinballs from the base board 11.

The winning game play effect device 14b is a device whose state changes each time a pinball enters a specific safe hole 14a, which pays out a large number of pinballs to the player for a winning game play when a certain condition is satisfied. For example, rotating drums as with a slot machine are provided and each time the player wins a game play, are rotated. When a predetermined symbol pattern is complete, a large number of pinballs are paid out to the player for a special winning game play.

Figure 4:
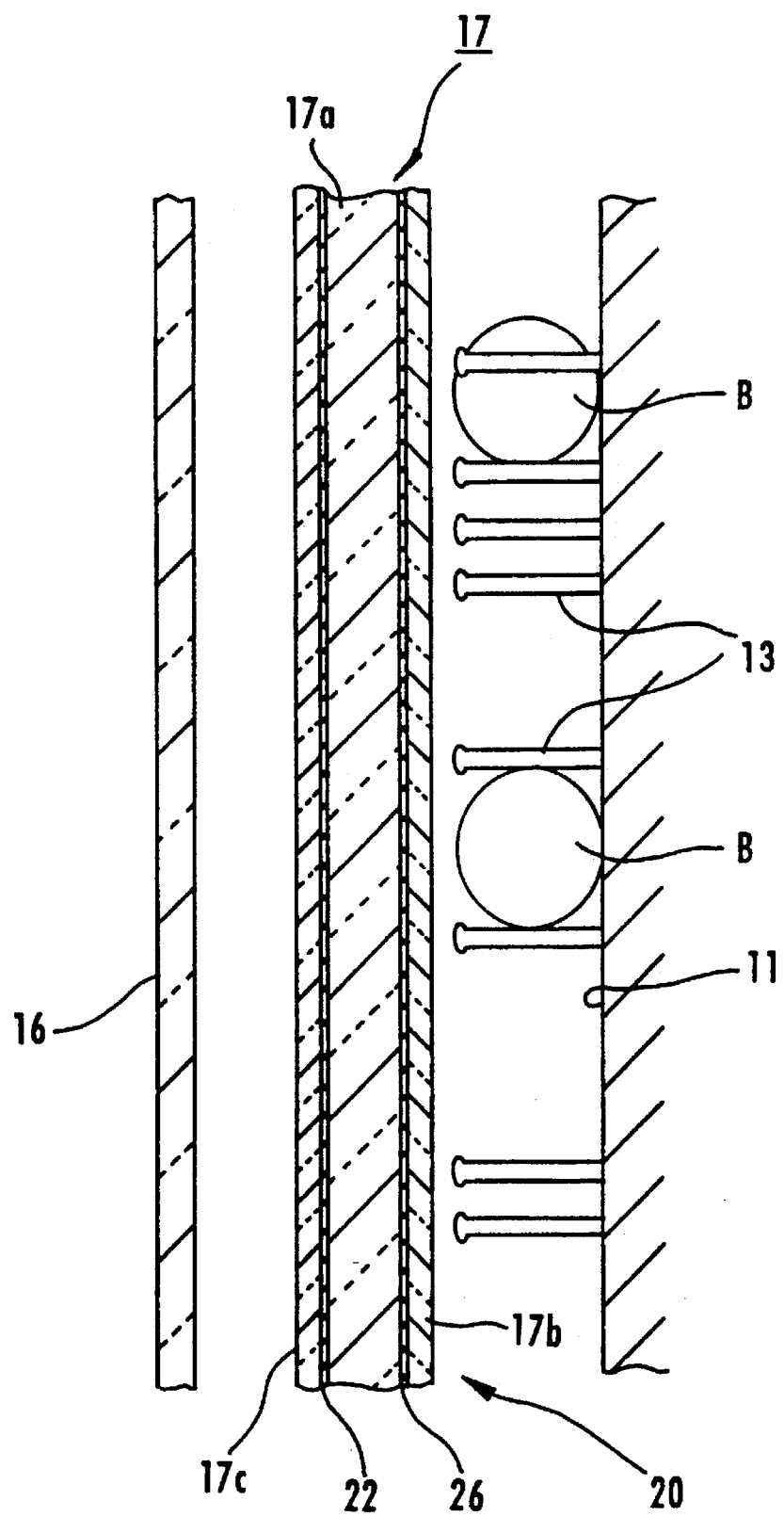
FIG. 4 is a sectional side view of a base board of the pinball machine.

The gaming area 12a of the base board 11 is provided with a large number of pins (nails) 13 with which pinballs B dropping along the base board 11 frequently collide for causing their motion direction to fluctuate. The pins 13 are hammered into the base board 11 substantially vertical to the base board 11 in a state in which they project from the base board 11 as long as the diameter of the metal substance B, as shown in FIG. 4. The pins 13 are distributed on the base board 11 for the purposes as described above.

A propelling handle 33 for players to propel pinballs and a pinball return 34 for receiving pinballs paid out for winning game plays are located on the front face of the pinball machine 10. The handle 33 is a part of the propelling mechanism.

As shown in FIG. 4, front glass covering the base board 11 has a double structure consisting of the surface glass substance 16 and an inner glass substance 17 along the base board 11 of the pinball machine 10. The inner glass substance 17 consists of a glass substrate 17a and surface glass 17b and 17c bonded to both faces of the glass substrate 17a.

Next, a first embodiment of a metal substance detection system of the invention will be discussed with reference to the accompanying drawings.

Figure 6:
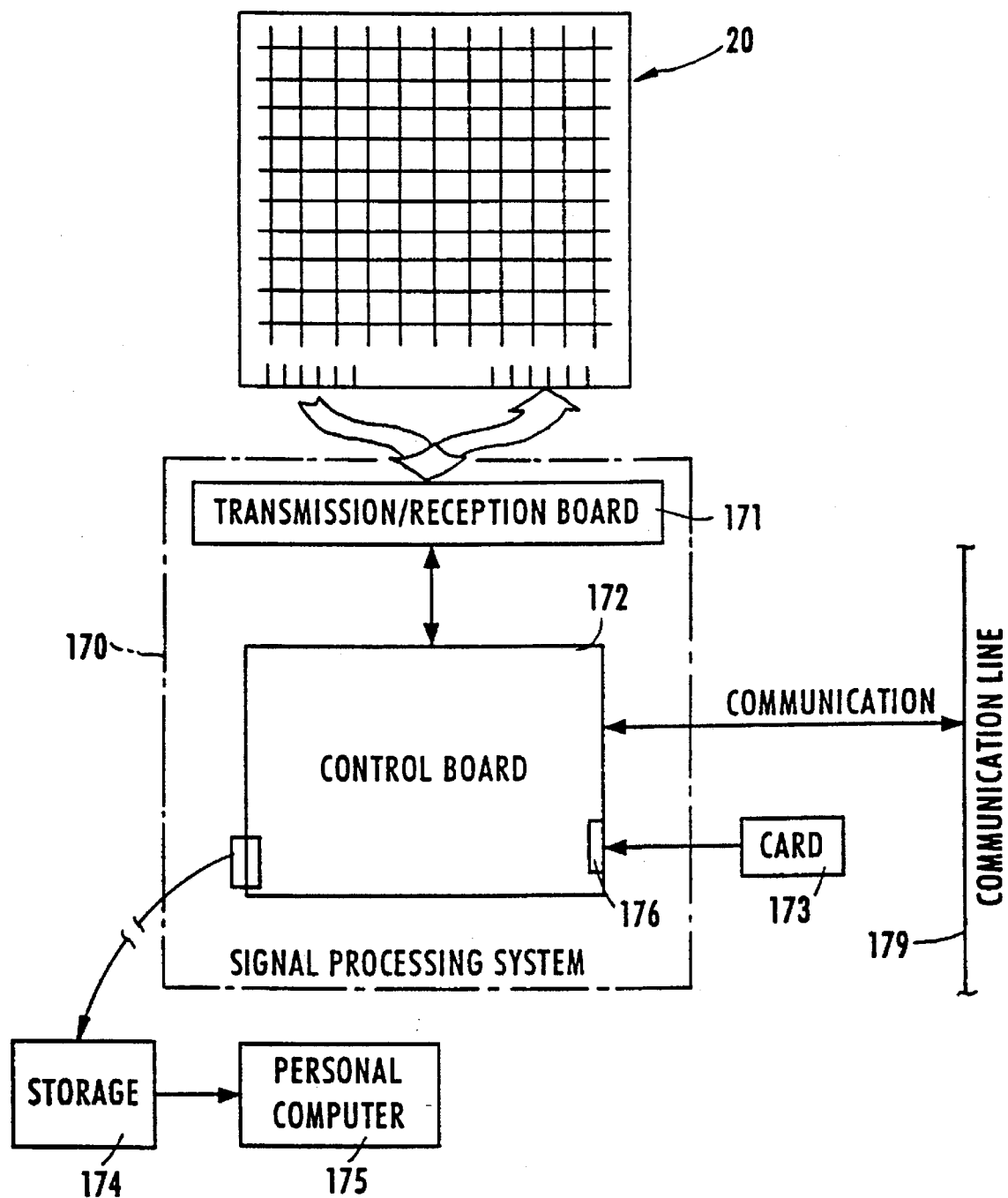
FIG. 6 is a block diagram showing the configuration of a first embodiment of the invention.

The metal substance detection system of the embodiment comprises a matrix sensor 20 having a detection area spreading like a plane and functioning as a metal sensor and a signal processing system (signal processing apparatus) 170 which drives the matrix sensor 20 for sensing the presence of a metal substance and detecting the position thereof, as shown in FIG. 6.

Figure 5:
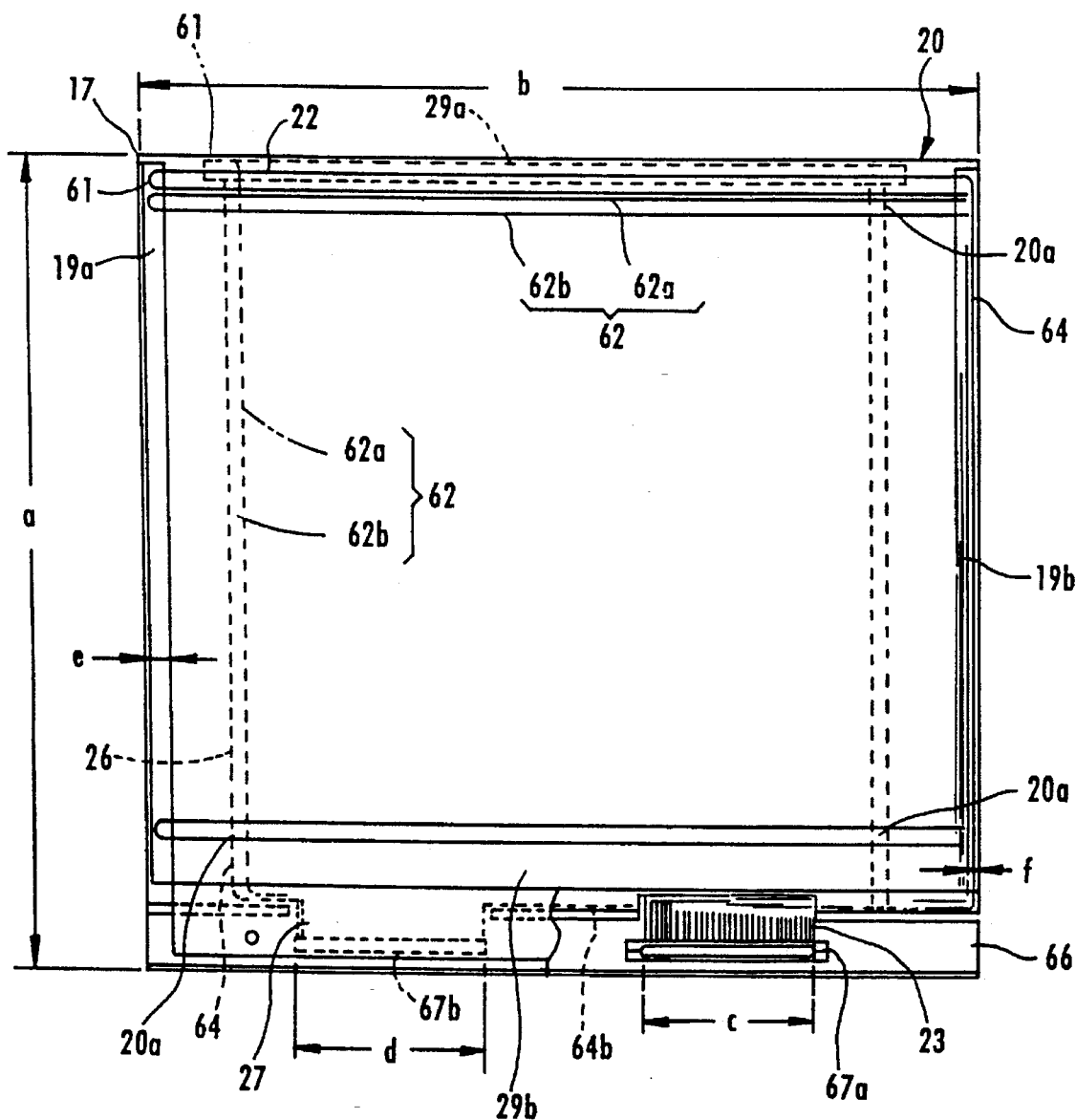
FIG. 5 is a front view showing a matrix sensor.

The matrix sensor 20 has a plurality of transmission lines 22, a plurality of reception lines 26, and a board for supporting the lines, as shown in FIG. 5. Each of the transmission lines 22 consists of a pair of conductors 62 forming a going way 62a and a returning way 62b which are parallel. Likewise, each of the reception lines 26 consists of a pair of conductors 62. In the embodiment, the conductor 62 is made of copper wire coated with polyurethane for insulation, for example. A pair of the conductors 62 comprises a going way and a returning way connected on one end and serving as input and output terminals of a signal on the other end.

The transmission lines 22 and the reception lines 26 are placed so as to cross each other. Specifically, for example, the transmission lines 22 are arranged at given intervals in a row direction and the reception lines 26 are arranged at given intervals in a column direction. The transmission lines 22 and the reception lines 26 are placed in such a manner to provide the intersections of the transmission lines 22 and the reception lines 26 like a matrix as sensing regions. Either the transmission lines 22 or the reception lines 26 may be placed in the row or column direction as desired.

The signal processing system 170 has a transmission/reception board 171 functioning as transmission/reception means for driving the matrix sensor 20 and a control board 172 functioning as signal processing means for controlling the transmission/reception board 171 for receiving a detection signal and determining whether or not a metal substance exists based on the detection signal and detecting the metal substance sensing position when a metal substance exists.

The transmission/reception board 171 has a transmission circuit 40 (see FIG. 7) for scanning the specified lines of the transmission lines 22 in sequence and sending a transmission signal thereto and a reception circuit 50 (see FIG. 9) for scanning the specified lines of the reception lines 26 in sequence and reading reception signals of the reception lines in sequence, as described below. The control board 172 specifies the transmission and reception lines to be scanned for the transmission/reception board 171, determines whether or not a metal substance exists from a signal received at the reception circuit 50, and detects the metal substance sensing position based on information indicating the transmission line scanning position at the transmission circuit 40 and information indicating the reception line scanning position at the reception circuit 50.

The control board 172 can store information indicating the presence position of a pinball in time sequence for finding the move path of the pinball. From the move path, the characteristics of the pinball machine can be known and an abnormal path can also be detected for judging whether or not illegal operation has been performed.

Next, the matrix sensor will be described in more detail.

As shown in FIG. 4, the matrix sensor 20 is formed like a plane within the inner glass substance 17, which is on the side of the base board 11, of the two glass substances covering the base board 11, and therefore is disposed between the front glass substance 16 and the base board 11.

As shown in FIG. 5, in the matrix sensor 20, the transmission lines 22 are placed on one face (on the side of the surface glass) of the glass substrate 17a of the inner glass substance 17 in parallel in one direction. Each transmission line 22 is located on the glass substrate 17a so as to make a U-turn (parallel turn form) at the end of the glass substrate 17a.

Likewise, the reception lines 26 are placed on the opposed face (on the side of the base board 11) of the glass substrate 17a of the inner glass substance 17 in parallel in one direction. Each reception line 26 is located on the glass substrate 17a so as to make a U-turn (parallel turn form) at the end of the glass substrate 17a. A transmission terminal section 23 and a reception terminal section 27 functioning as connection sections of the transmission lines 22 and the reception lines 26 are placed collectively on the lower end of the inner glass substance 17 in top and bottom relation when the matrix sensor is mounted on a pinball machine.

The reception lines 26 are located at right angles to plane parallel positions with the transmission lines 22 so as to be electro-magnetically coupled with the transmission lines 22, namely, in positional relation such that a magnetic flux from the transmission line 22 interlinks. The transmission lines 22 and the reception lines 26 with the inner glass substance 17 as a substrate make up the plane matrix sensor 20.

As shown in FIG. 5, square portions surrounded by the transmission lines 22 and the reception lines 26 crossing each other, detection positions, provide sensing units 20a, 20a, . . . for sensing a metal substance. In the embodiment, the sensing unit 20a, 20a, . . . is set to a size being capable of sensing a pinball.

The inner glass substance 17 is a glass substrate of a quadrangle having dimensions of 367 mm±10 mm in length a and 367 mm±10 mm in width b and 3.0–3.5 mm in thickness. Each of the surface glass 17b and 17c is shorter than the glass substrate 17a in length and the lower end of the glass substrate 17a is exposed.

To form the inner glass substance 17, the transmission lines 22 are bonded to one face of the glass substrate 17a with a transparent adhesive layer and the surface glass 17c is bonded thereon with a transparent adhesive layer; the reception lines 26 are bonded to the other face of the glass substrate 17a with a transparent adhesive layer and the surface glass 17b is bonded thereon with a transparent adhesive layer. As shown in FIG. 5, a turn substrate 19a and a transmission route substrate 19b like an L letter are disposed in the left end part and right end part, respectively, on one face.

A turn substrate 29a and a route substrate 29b are disposed in the upper end part and lower end part, respectively, on the other face of the glass substrate 17a.

As shown in FIG. 5, each of the transmission lines 22 consists of a turn part 61 formed on the turn substrate 19a and wires 62a and 62b soldered to the turn part 61. The input and output terminals of the transmission line 22 are connected via route wire to the transmission terminal section 23.

On the other hand, as shown in FIG. 5, each of the reception lines 26 consists of a turn part 61 formed on the turn substrate 29a and wires 62a and 62b soldered to the turn part 61. The lower end part of the reception line 26 is connected to the reception terminal section 27 by a route part 64 formed on the route substrate 29b bonded to the lower end of the other face of the glass substrate 17a.

To make the wires 62a and 62b invisible for the customers, their surfaces are of a matte black finish intended for protecting against light reflection.

A preferred pattern of the matrix sensor 20 of a normal pinball machine 10 consists of 32 rows of the transmission lines 22 and 32 columns of the reception lines 26, namely, 1024 sensing units 20a in total. The embodiment takes the pattern of the 32 rows of the transmission lines 22 and 32 columns of the reception lines 26 as an example. In FIG. 5, only outer parts of the pattern are shown.

Preferably, each of the wires making up the transmission lines 22 and the reception lines 26 is 25 μm–30 μm thick. In the embodiment, as shown in FIG. 5, the whole widths of the transmission terminal section 23 and the reception terminal section 27, c and d, are each 126 mm and the widths of the longitudinally extending portions of the transmission turn substrate 19a and the transmission route substrate 19b, e and f, are formed each 10 mm or less. The width of one line of the transmission terminal section 23 and the reception terminal section 27 is 1.5 mm.

The matrix sensor 20 is formed with a connector mounting plate 66 in the lower end part of the glass substrate 17a. The connector mounting plate 66 has both sides between which the lower end of the glass substrate 17a is sandwiched, and is integral with the inner glass substance 17. The connector mounting plate 66, which is made of plastic or stainless material, extends downward along the width of the inner glass substance 17 and is on an extension plane of the inner glass substance 17 of the matrix sensor 20.

A transmission connector 67a and a reception connector 67b are fixed to the positions of the connector mounting plate 66 corresponding to the transmission terminal section 23 and the reception terminal section 27. The terminals of the transmission terminal section 23 and the reception terminal section 27 are connected via these connectors to the transmission circuit 40 and the reception circuit 50.

The connector mounting plate 66 has the thickest portions in which the transmission connector 67a and the reception connector 67b are mounted. On the other hand, the transmission connector 67a and the reception connector 67b are short and the thickest portion of the connector mounting plate 66 is as thick as or slightly thinner than the inner glass substance 17 of the matrix sensor 20.

The transmission/reception board 171 (see FIG. 6) connected to the transmission connector 67a and the reception connector 67b is placed on the connector mounting plate 66. The transmission/reception board 171 has the transmission circuit 40 (see FIG. 7) for transmitting signals to the transmission lines 22 of the matrix sensor 20, the reception circuit 50 (see FIG. 9) for receiving signals from the reception lines 26, and junction connectors (not shown) connected to the transmission connector 67a and the reception connector 67b.

The junction connectors are connected to the transmission connector 67a and the reception connector 67b for connecting the transmission terminal section 23 to the transmission circuit 40 and the reception terminal section 27 to the reception circuit 50.

Next, the signal processing system which processes signals of the matrix sensor 20 will be described.

As shown in FIG. 6, the matrix sensor 20 is placed under the control of the control board 172 spaced from the matrix sensor 20 via the transmission/reception board 171. The control board 172 has an information processor 30 shown in FIG. 10 and can communicate with other systems on a communication line 179. The control board 172 also has an interface section 176 for the information processor 30 to read monitor points from a card 173. The information processor 30 has at least a central processing unit (CPU) (not shown) and a memory (not shown) for storing CPU programs and data.

The card 173 is a memory card that can be mounted and demounted on the interface section 176. The card 173 stores at least data indicating pinball monitor points such as detection positions of pinballs propelled into safe holes 14a, 14a, . . . and a game area provided on the base board 11 of a pinball machine 10, and the position of an out hole 15; and a detection algorithm of pinballs entering the safe holes 14a, 14a, . . . and the out hole 15, as monitor data. In the embodiment, the card 173 further stores scan information specifying the transmission and reception lines to be scanned.

The memory mounted on the card can use RAM, mask ROM, EPROM, one-shot ROM, etc.

A storage 174 connected to the control board 172 is used to record paths of pinballs moving in space between the base board 11 of the pinball machine 10 and the inner glass substance 17. The storage 174 can be provided by a hard disk storage device, for example. The data recorded in the storage 174 can be loaded into a computer 175 containing software for analyzing pinball paths and performing operations on the data to provide data required for the pinball parlor. All or a part of the data indicating the monitor points, the pinball detection algorithm, and scan information may be stored in the storage 174.

The transmission circuit 40 is a circuit for transmitting a signal of a predetermined frequency to each transmission line 22 in sequence. The reception circuit 50 is a circuit for receiving a signal from each reception line 26 in sequence in synchronization with the transmission circuit 40. A continuous sine wave of frequency 1–1.3 MHz centering on 0 V is preferred as a voltage waveform applied to the transmission line 22 by the transmission circuit 40.

Figure 7:
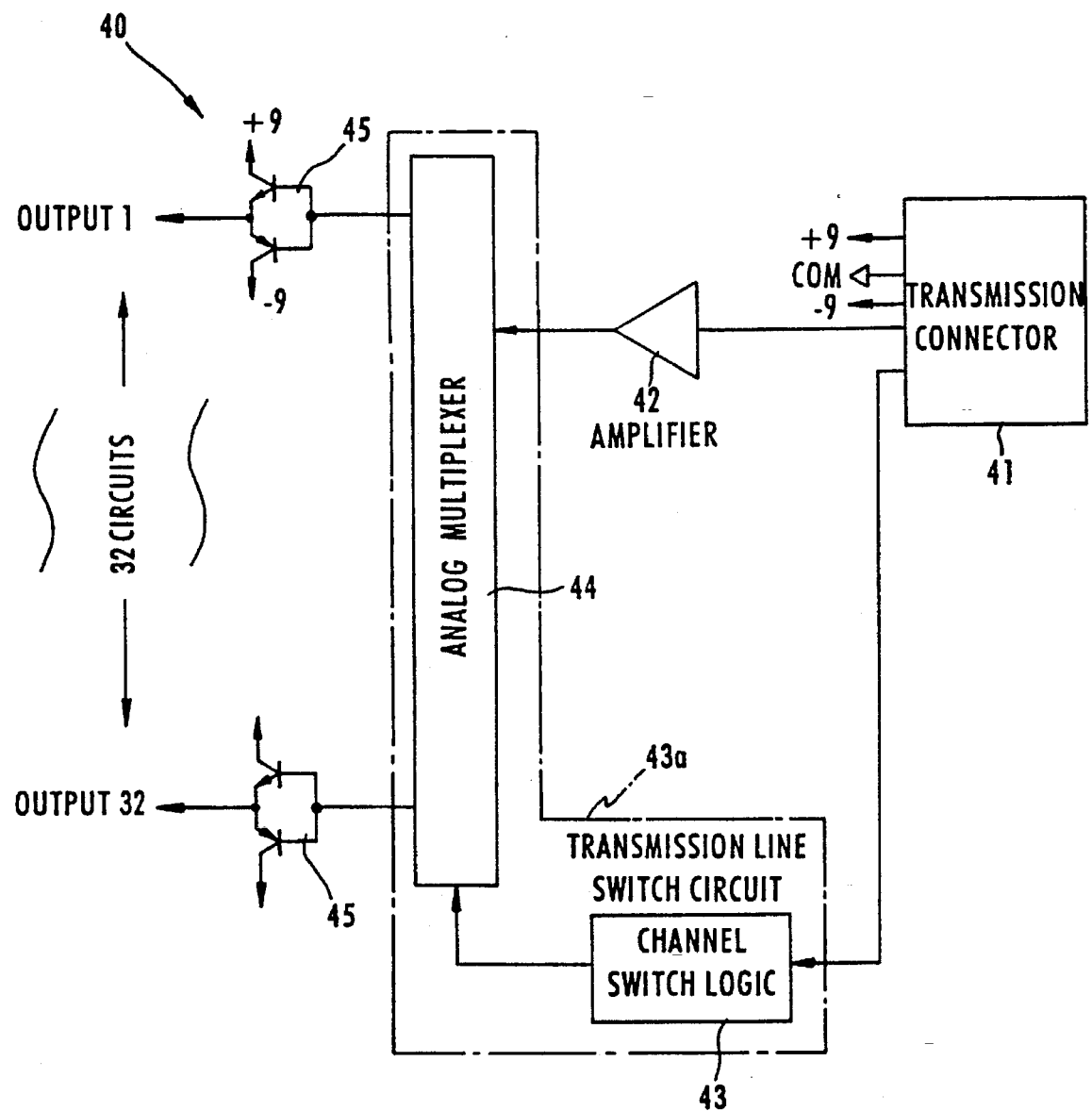
FIG. 7 is a block diagram of a transmission circuit of a transmission/reception board.

As shown in FIG. 7, the transmission circuit 40 consists of a transmission connector 41, an amplifier 42 connected to the transmission connector 41, a transmission line switch circuit 43a for switching the transmission line to which a signal current is to be transmitted in sequence each time a transmission line switch pulse is input, and 32 totem-pole drivers 45 each connected to one end of each of the 32 transmission lines 22 via the transmission connector 67a. The transmission line switch circuit 43a has a channel switch logic 43 and an analog multiplexer 44 being connected to the amplifier 42 and the channel switch logic 43 for switching so as to connect the amplifier 42 to the totem-pole driver 45 corresponding to the specified transmission line 22. Each totem-pole driver 45 comprises an NPN transistor and a PNP transistor, which have emitters connected to each other and bases connected to each other.

Figure 8:
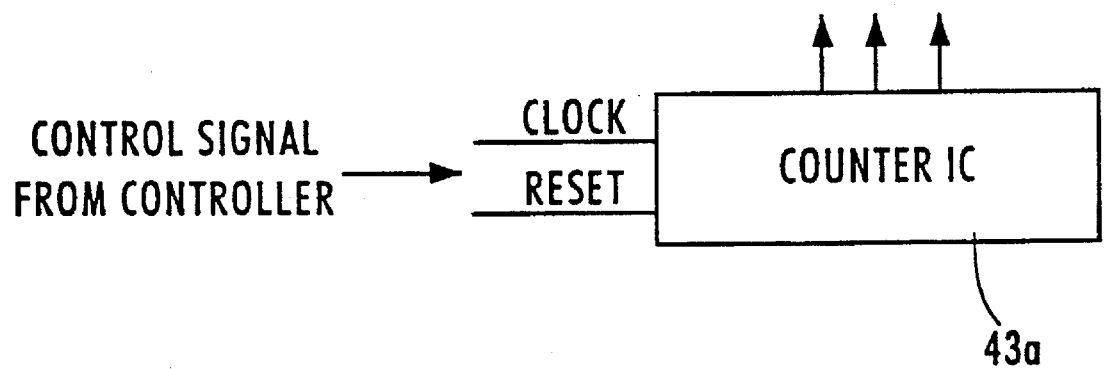
FIG. 8 is a block diagram showing the main part of a channel switch logic.

The channel switch logic 43 has a counter IC 43a and operates with two control lines for clock and reset, as shown in FIG. 8. Specifically, each time a transmission line switch pulse is input from a transmission line switch pulse generating circuit 204 of a sequence controlling circuit 47 described below, the connection state of the analog multiplexer 44 is switched in sequence so as to connect to the specified transmission line.

Figure 9:
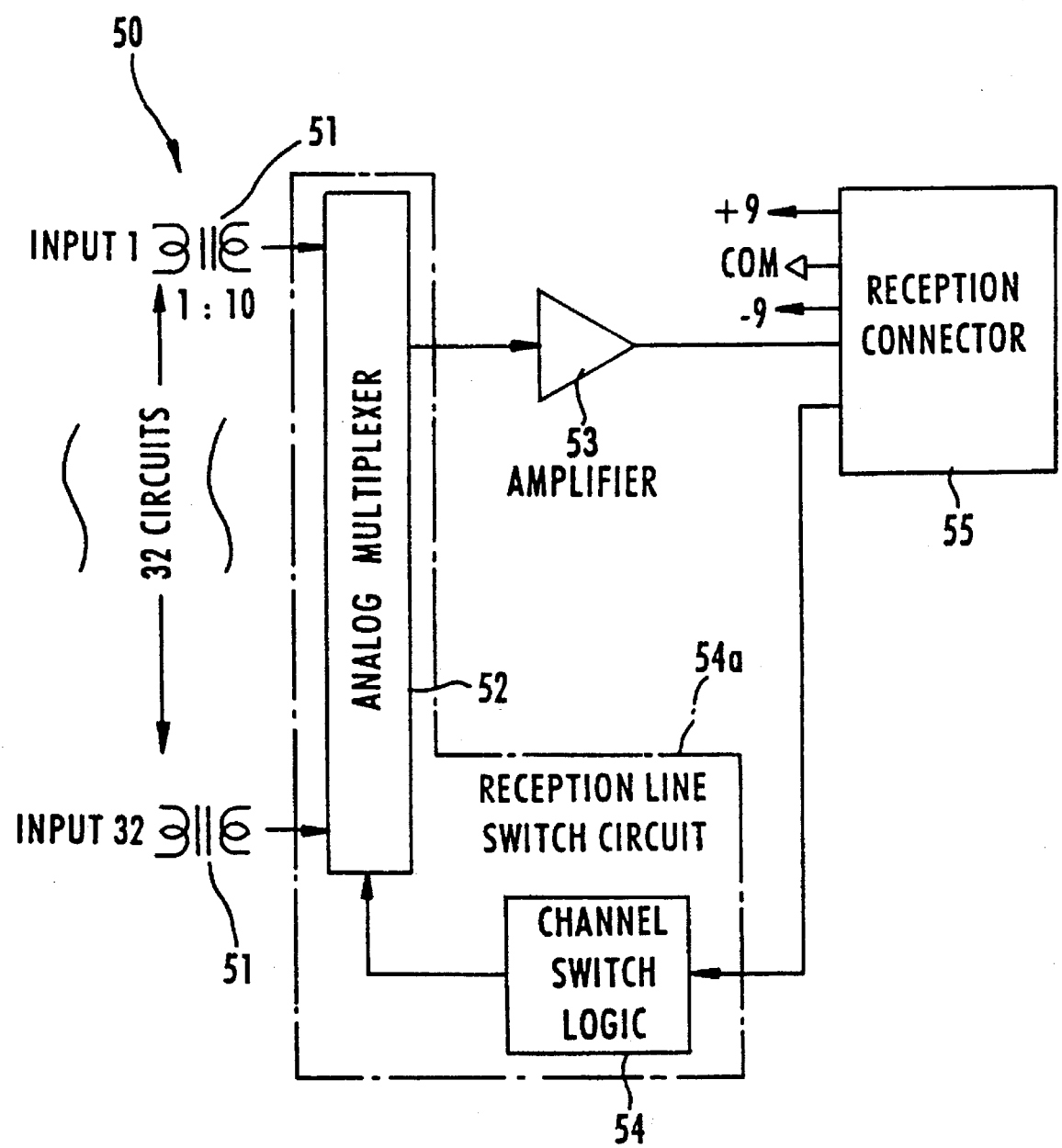
FIG. 9 is a block diagram of a reception circuit of the transmission/reception board.

As shown in FIG. 9, the reception circuit 50 consists of 32 CTs (current transformers) 51 connected to the 32 reception lines 26 via the reception connector 67b, a reception line switch circuit 54a being connected to the CTs 51 for switching the reception line to be detected in sequence each time a reception line switch pulse is input, an amplifier 53 connected to the reception line switch circuit 54a, and a reception connector 55 connected to the amplifier 53 and the reception line switch circuit 54a. The reception line switch circuit 54a has an analog multiplexer 52 and a channel switch logic 54 connected to the analog multiplexer 52. Therefore, the reception circuit 50 is adapted to receive a signal from each reception line 26 via each CT 51.

The CT 51 insulates its corresponding reception line from the analog multiplexer 52 and magnifies a signal from the corresponding reception line by 10 times. The analog multiplexer 52 receives signals in sequence from the specified CTs 51 based on a command of the channel switch logic 54.

The amplifier 53 amplifies a signal from the analog multiplexer 52.

The channel switch logic 54 is similar element to the channel switch logic 43 of the transmission circuit 40. Each time a reception line switch pulse is input from a reception line switch pulse generating circuit 202 (described below) of the sequence controlling circuit 47 (every scanning period), the input switch state of the analog multiplexer 52 is changed on the falling edge of the pulse signal.

Figure 10:
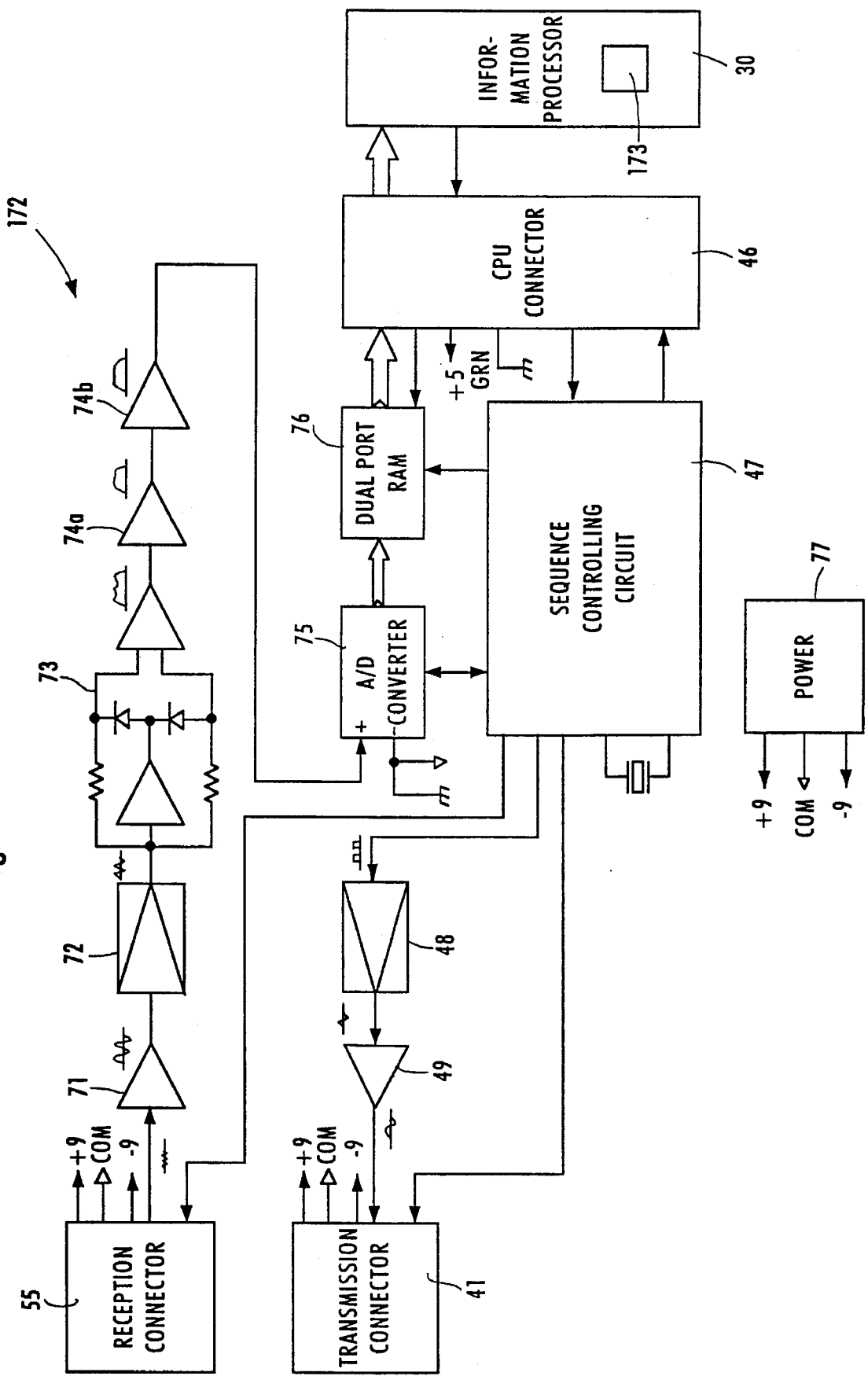
FIG. 10 is a block diagram showing the configuration of a control board.

As shown in FIG. 10, the control board 172, which contains the information processor 30, has a transmission section comprising a sequence controlling circuit 47 for sending a transmission clock in response to a start signal input from the information processor 30 via a CPU connector 46, a band-pass filter 48 for receiving the transmission clock and outputting a transmission signal, and an amplifier 49 for amplifying the transmission signal and sending the amplified signal to the transmission connector 41.

The control board 172 has a reception section comprising an amplifier 71 for amplifying a reception signal from the reception connector 55, a band-pass filter 72 for receiving the amplified signal, a full-wave rectification amplifier 73 for receiving the reception signal through the band-pass filter 72, two low-pass filters 74a and 74b for receiving the reception signal from the full-wave rectification amplifier 73, an A/D converter 75 for receiving the reception signal through the low-pass filter 74b, converting the reception signal into digital data under the control of the sequence controlling circuit 47, and outputting the digital data, and a dual port RAM 76 for writing the digital data under the control of the sequence controlling circuit 47 and sending the data via the CPU connector 46 to the information processor 30 in response to a read signal from the CPU connector 46.

The control board 172 has a power unit 77. The dual port RAM 76 has a capacity of 2048 bytes, for example.

The sequence controlling circuit 47 has a function of outputting a basic clock used as a source of a signal input to each transmission line 22 and a function of outputting the above-mentioned reception line switch pulse signal (first timing signal) for controlling the channel switch logic 54 and the above-mentioned transmission line switch pulse signal (second timing signal) for controlling the channel switch logic 43.

That is, the sequence controlling circuit 47 comprises a clock circuit 201 for outputting a basic clock signal, a reception line switch pulse generating circuit 202 for dividing the basic clock from the clock circuit 201 for outputting a reception line switch pulse signal (RXCLK in FIG. 2) every scanning period, for example, every basic clock, an interrupt pulse signal generating circuit 203 for further dividing the output of the reception line switch pulse generating circuit 202 for forming two pulses each time all reception lines 26 are switched (each time 32 reception line switch pulses are output) and generating two interrupt pulses (INT in FIG. 2) on the rising edges of the two pulse signals, and a transmission line switch pulse generating circuit 204 for outputting as many transmission line switch pulse signals (TXCLK in FIG. 2; each having extremely short pulse width as compared with the reception line switch pulse signal) as the skip count specified by the information processor 30 on the rising edge of every other interrupt pulse signal.

The sequence controlling circuit 47 has a circuit (not shown) for dividing the basic clock for outputting the transmission clock.

Figure 2:
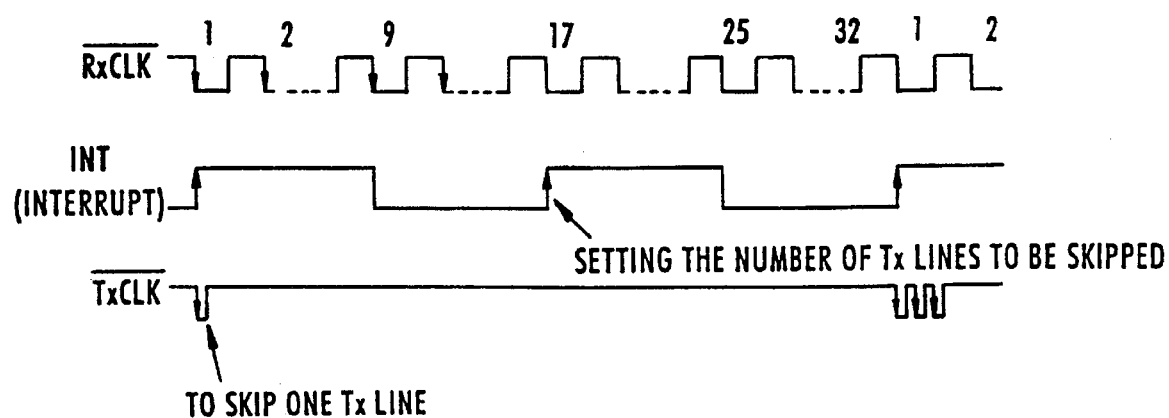
FIG. 2 is a waveform chart of control signals output from the sequence controlling circuit shown in FIG. 1.

In the detection operation, the information processor 30 reads the above-mentioned scan information from the card 173 (storage medium), receives the interrupt pulse signal INT from the interrupt pulse signal generating circuit 203, and sets a new skip count in the transmission line switch pulse generating circuit 204 each time all reception lines 26 are switched. That is, if the next transmission line ready to transmit an input signal does not receive transmission specification in the course of switching a sequence of the reception lines, in the embodiment, at the timing of switching to the 17th reception line or on the rising edge of the interrupt pulse signal INT as shown in FIG. 2, the information processor 30 instructs the transmission line switch pulse generating circuit 204 to skip the transmission line. If continuous transmission lines are not used for signal detection, the information processor 30 instructs the transmission line switch pulse generating circuit 204 to skip these transmission lines.

The transmission line switch pulse generating circuit 204 outputs the transmission line switch pulse signal TXCLK in the interrupt pulse period next to the skip setting (in FIG. 2, at the timing of switching to the first reception line). At the time, if the next transmission line is not skipped, one pulse is output, thereby switching the current transmission line to the next transmission line. However, if the next transmission line is to be skipped, successively the transmission line switch pulse signal TXCLK is output, thereby switching the current transmission line to the next next transmission line; the next transmission line on which a transmission signal should be transmitted is skipped. Therefore, the transmission line switch pulse generating circuit 204 outputs one pulse of the transmission line switch pulse signal TXCLK for switching the current transmission line to the next transmission line or (n+1) pulses of the transmission line switch pulse signal TXCLK for skipping one or more successive signal lines, where n is the number of signal lines to be skipped.

The information processor 30 is also programmed so as to read monitor area data registered on the card 173 and sense data stored in the dual port RAM 76, and compare the sense data with the monitor area data of pinballs for monitoring pinballs, independently of the detection operation under the control of the sequence controlling circuit 47 or the information processor 30.

Next, the operation of the embodiment will be described.

Figure 11:
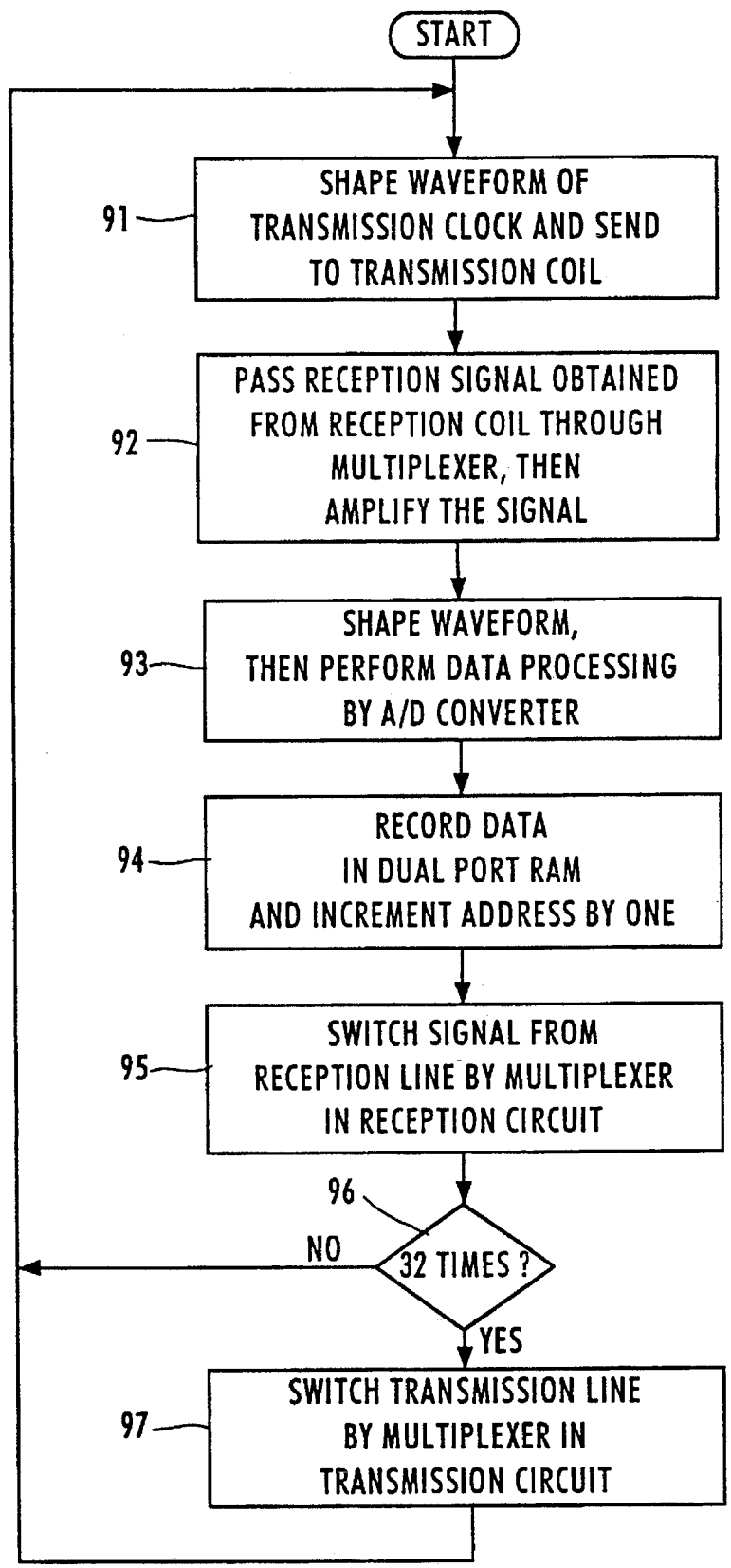
FIG. 11 is a flowchart of scanning of the matrix sensor.

Address signals and control signals from the information processor 30 are output via the CPU connector 46. FIG. 11 shows a process flow. First, an example in which scanning of all transmission lines is specified will be discussed.

When a start signal is transmitted from the information processor 30 to the sequence controlling circuit 47, the sequence controlling circuit 47 divides a 16-MHz basic clock in response to necessary clock frequency for generating and outputting a transmission clock. The waveform of the transmission clock from the sequence controlling circuit 47 is shaped from digital signal into analog signal through the band-pass filter 48, then the analog signal is amplified by the amplifier 49 and sent to the transmission connector Further, the transmission signal is amplified by the amplifier 42 in the transmission circuit 40. The analog multiplexer 44 operates the totem-pole drivers 45 in sequence on channels switched by the channel switch logic 43, whereby the totem-pole drivers 45 output the signal amplified by the amplifier 42 to the transmission lines in sequence (step 91).

Then, electromagnetic induction effect causes an electromotive force to occur on the reception lines 26 crossing the transmission line 22 on which the signal is transmitted. At the time, as a pinball which is metal approaches a sensing unit 20a, the magnitude of the electromotive force (induced current) of the reception line 26 changes in the sensing unit 20a.

The reason why it changes is not analyzed clearly at present, but can be considered as follows: First, a pinball, which made of a material consisting essentially of iron, is a ferromagnetic substance. Thus, a magnetic flux occurring on the transmission line 22 and spread into a space converges on the pinball and the magnetic flux distribution interlinking the reception lines changes. At the same time, an eddy current occurs on the pinball in a direction of canceling the magnetic flux on the transmission line 22. These causes the induced current to change. Which cause is dominant varies depending on the relative positional relationship between the pinball and the transmission line 22 and reception line 26. Whether or not the magnetic flux interlinking with the reception line 26 increases also varies depending on the relative positional relationship with the pinball. It also varies depending on whether or not metal exists on the background.

In the reception section, the reception circuit 50 receives a signal from each reception line 26 via each CT 51 in synchronization with the transmission circuit 40 under the control of the sequence controlling circuit 47. As shown in FIG. 9, voltage caused by induced current appearing on the reception lines 26 is magnified by 10 times by the CT 51. To convert the voltage by the CT 51 eliminates the need for making a large amplification degree of the amplifier in the reception circuit. The CTs 51 insulate the reception lines 26 of the matrix sensor 20 from the analog multiplexer 52 in the reception circuit 50 for preventing noise from entering the reception circuit 50 from the pinball machine 10.

The analog multiplexer 52 switches signals received from the reception lines 26 through the CTs 51 by the channel switch logic 54 and outputs them in sequence. Each signal output from the analog multiplexer 52 is amplified by 100 times by the amplifier 53 (step 92).

The reception signal is amplified and detected via the reception connector 55, the amplifier 71, and the band-pass filter 72. The reception signal passed through the band-pass filter 72 results in an analog signal, which is then shaped by the full-wave rectification amplifier 73. The output signal from the full-wave rectification amplifier 73 is averaged by integration processing through the low-pass filters 74a and 74b.

Next, the reception signal is sent to the A/D converter 75. The A/D converter 75 converts the signal from the reception line 26 into a digital signal in predetermined bit units, such as 12 bits, and outputs the resultant digital signal (sense data) to the dual port RAM 76 for storage under the control of the sequence controlling circuit 47 (step 93).

That is, the sense data is recorded in the dual port RAM 76 in response to a write signal from the sequence controlling circuit 47 independently of the operation of the information processor 30, then the address is incremented by one every scanning period based on the clock signal output by the sequence controlling circuit 47, for example, every clock (step 94), and the sense data is stored in a different address for each sensing unit 20a.

These steps are repeated every scanning period. That is, the analog multiplexer 52 in the reception circuit 50 switches the signal from each reception line 26 every scanning period at step 95 and the above-mentioned operation is performed 32 times for the 32 reception lines 26 (one for each line) at step 96. Upon completion at step 96, the analog multiplexer 44 in the transmission circuit 40 switches the current transmission line 22 at step 97. Again, similar processing is repeated 32 times for storing the sense data for each sensing unit 20a in different addresses of the dual port RAM 76 in sequence in relation to the sensing units 20a.

Therefore, the information processor 30 can read the sense data stored in the dual port RAM 76 for judging a pinball exists at what time at what position (sensing unit 20a) under any desired retrieval conditions whenever necessary independently of the above-mentioned detection signal processing.

Thus, the information processor 30 can read the sense data recorded in the dual port RAM 76 by a read start signal, as required, perform operations on the read sense data, and compare the sense data with the pinball monitor data stored on the card 173 for monitoring pinballs.

The operation is repeated every scanning period.

Next, an example in which a transmission signal is not sent to some of the transmission lines 22 will be discussed.

Not to send a transmission signal, information indicating lines to which no transmission signal is sent, namely, lines not to be scanned, needs to be specified. The specification may be either specification of lines not to be scanned or of lines to be scanned. In the embodiment, the card 173 provides the signal processing system with scan information specifying the transmission lines 22 to be scanned.

The information lines 22 for which detection is not specified in the scan information provided by the card 173 are skipped by the operation of the scanning system described above. The reason why the card 173 provides the signal processing system with the scan information is that even if the configuration of the pinball machine is changed, the signal processing system can deal with the change without modification of the system.

The channel switch logic 54 and the analog multiplexer 52 switch a signal from each reception line 26 in sequence every scanning period indicated by the reception line switch pulse signal RXCLK (see step 95). Upon completion of 32 repetitions of the operation for the 32 reception lines 26 (see step 96), the channel switch logic 43 and the analog multiplexer 44 switch the current transmission line 22 based on the transmission line switch pulse signal TXCLK (see step 97). Again, similar processing is repeated 32 times. The number of pulses of the transmission line switch pulse signal TXCLK output when the transmission line is switched is the skip count set in the transmission line switch pulse generating circuit 204 by the information processor 30 on the rising edge of the interrupt pulse signal preceding the current interrupt pulse signal, as shown in FIG. 2. Therefore, as many transmission lines 22 as the skip count are skipped.

For example, when the next and next next transmission lines 22 to which a signal is to be input are not registered as detection positions in the scan information registered on the card 173, three pulses of the transmission line switch pulse signal TXCLK are output as shown in FIG. 2. Thus, the two transmission lines 22 are skipped.

The transmission line switch pulse signal TXCLK is shown in magnified wavelength in FIG. 2; in fact, it has an extremely short pulse width. The skip operation is performed for considerably shorter time than the scanning period. Thus, the skip time does not hinder the detection operation on the first reception line 26 immediately after the transmission line is switched.

The information processor 30 can read the sense data stored in the dual port RAM 76 for judging a pinball exists at what time at what position (sensing unit 20a) under any desired retrieval conditions whenever necessary independently of the above-mentioned detection signal processing.

Thus, the information processor 30 can read the sense data recorded in the dual port RAM 76 by a read start signal, as required, perform operations on the read sense data, and compare the sense data with the pinball monitor data stored on the card 173 for monitoring pinballs.

The metal substance detection system of the embodiment can omit the detection operation on specific transmission lines as specified in the scan information stored on the card 173 that can be set as desired by the user and perform the detection operation only on the specified transmission lines 22 one after another; pinballs can be managed based on the detection operation results.

Therefore, if the metal substance detection system is used for detecting pinballs, the scan information can be set according to the pinball machine type, etc., for scanning a minimum necessary range corresponding to the pinball machine type, etc., without wasting the time for improving the detection speed.

Figure 1:
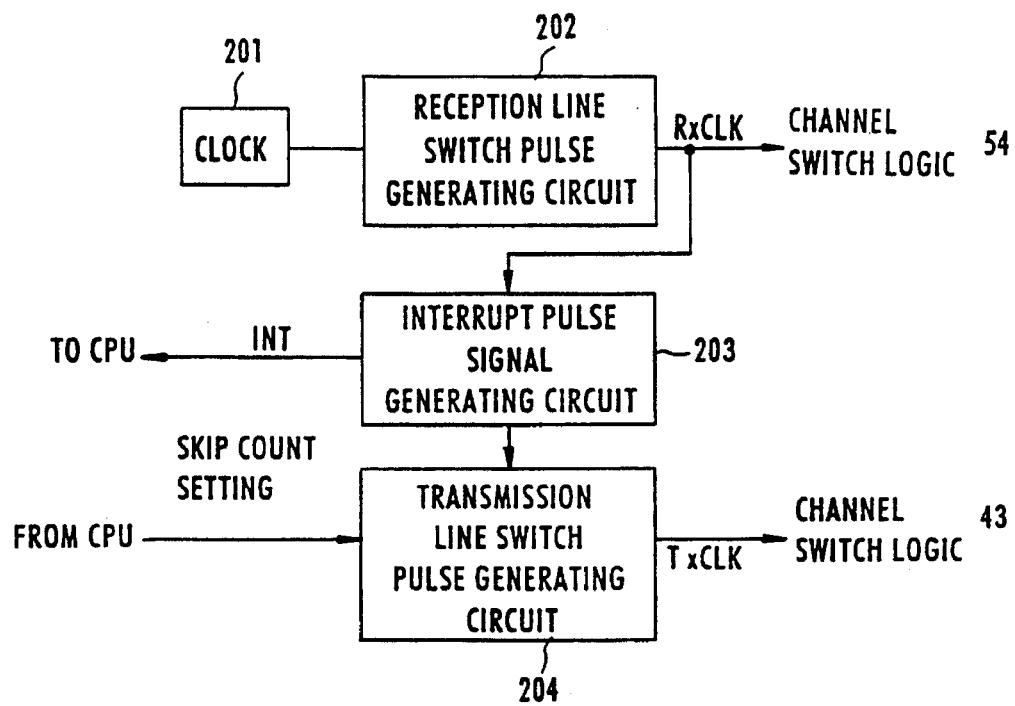
FIG. 1 is a block diagram showing the configuration of a sequence controlling circuit used in embodiment of the invention.

In the embodiment, the sequence controlling circuit 47 outputs a first timing signal to the reception circuit 50 for scanning the lines in sequence and a second timing signal to the transmission circuit 40 for switching the current scanning to the next line each time all reception lines have been scanned. Therefore, lines not to be scanned are specified for the transmission lines scanned in response to the second timing signal. However, the invention is not limited to the configuration. For example, all transmission lines may be scanned and some reception lines may be skipped, in which case replacement may be made in the circuit shown in FIG. 1 so that the output of the reception line switch pulse generating circuit 202 should be sent to the channel switch logic 43 and the output of the transmission line switch pulse generating circuit 204 should be sent to the channel switch logic 54.

Next, a second embodiment of the invention will be discussed with reference to the accompanying drawings.

Figure 14:
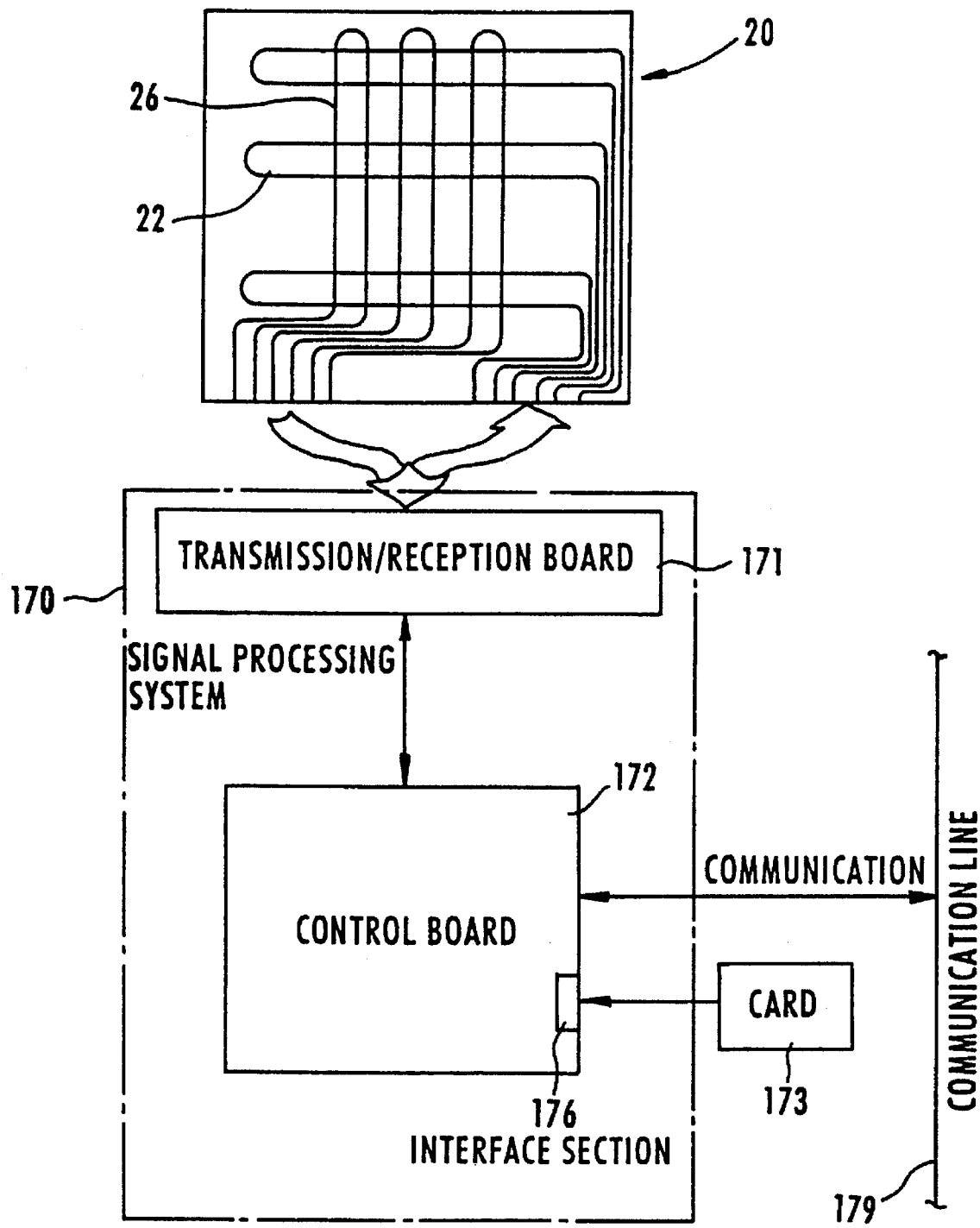
FIG. 14 is a block diagram showing the configuration of the second embodiment of the invention.

The second embodiment comprises a matrix sensor 20 and a signal processing system 170 which drives the matrix sensor 20, as shown in FIG. 14.

Figure 12:
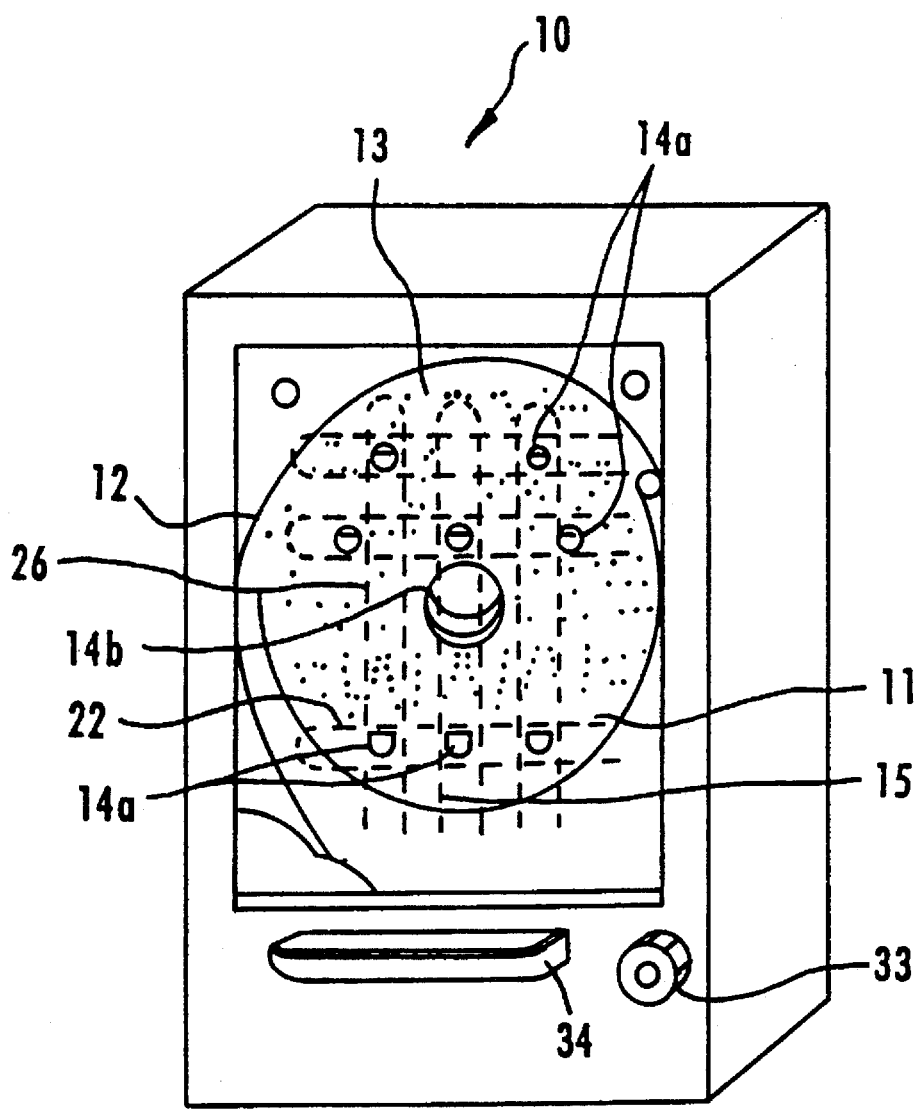
FIG. 12 is a perspective view showing an outline of a pinball machine to which a second embodiment of the invention is applied.
Figure 13:
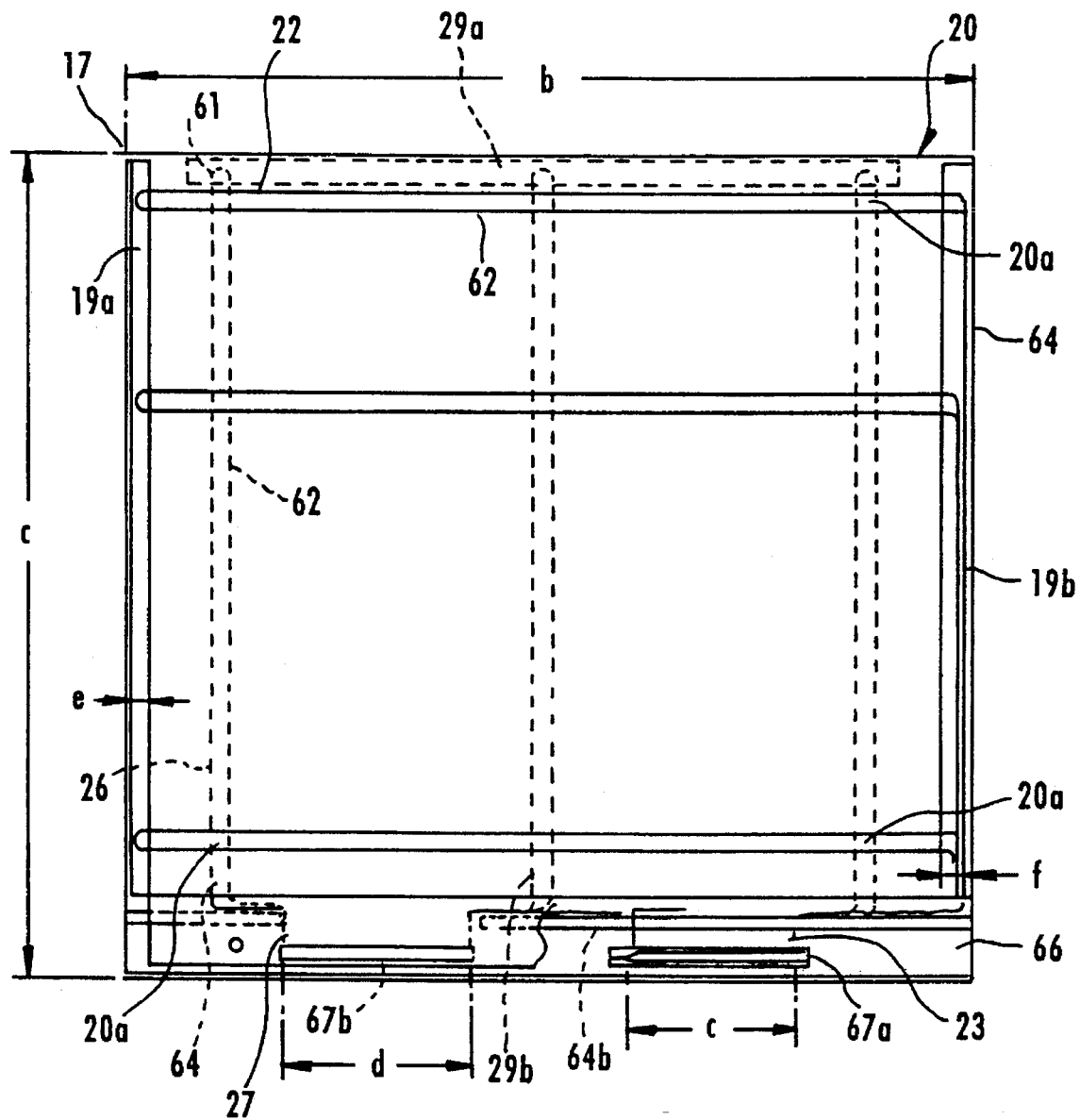
FIG. 13 is a front view showing the structure of a matrix sensor applied to the second embodiment of the invention.

As shown in FIG. 13, the matrix sensor 20 has transmission lines 22 and reception lines 26, each line consisting of a pair of conductors 62, placed on a board 17 so as to cross each other, as in the first embodiment. The second embodiment differs from the first embodiment in that the transmission lines 22 and the reception lines 26 do not make up a complete matrix. That is, three transmission lines 22 are disposed at positions corresponding to safe holes 14a and three reception lines 26 are disposed at positions corresponding to safe holes 14a, as shown in FIG. 12.

Position data of the safe holes 14a, 14a, . . . made on a base board 11 of a pinball machine 10, a detection algorithm of pinballs entering the safe holes 14a, 14a, . . . , or the like are recorded on a card 173 as monitor data, as in the first embodiment.

Figure 15:
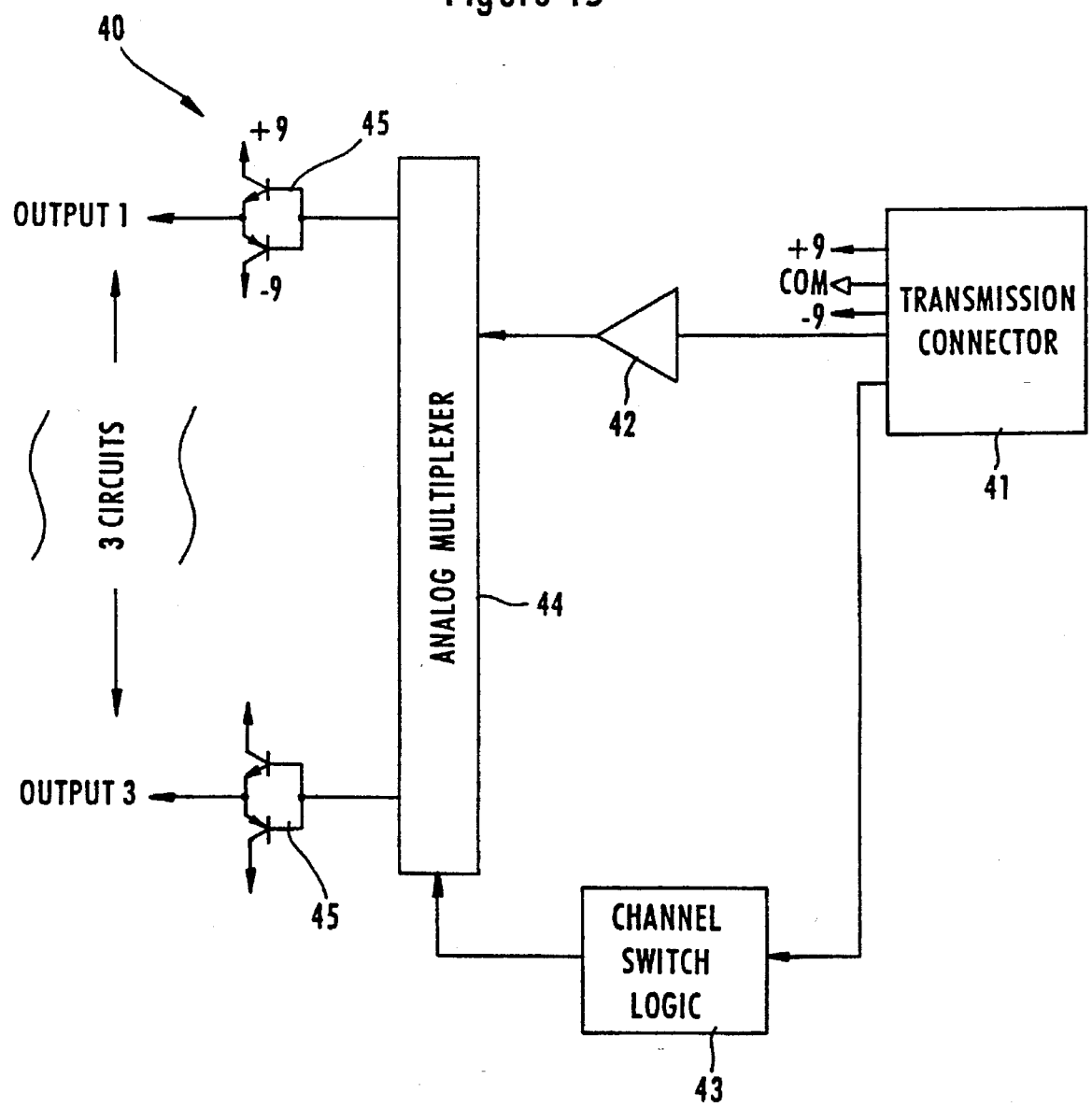
FIG. 15 is a block diagram of a transmission circuit of a transmission/reception board used with the second embodiment of the invention.

As shown in FIG. 15, a transmission circuit 40 consists of a transmission connector 41, an amplifier 42 and a channel switch logic 43 connected to the transmission connector 41, an analog multiplexer 44 connected to the amplifier 42 and the channel switch logic 43, and three totem-pole drivers 45 connected to the analog multiplexer 44 and also connected to three transmission lines 22 via a transmission connector 67a.

Figure 16:
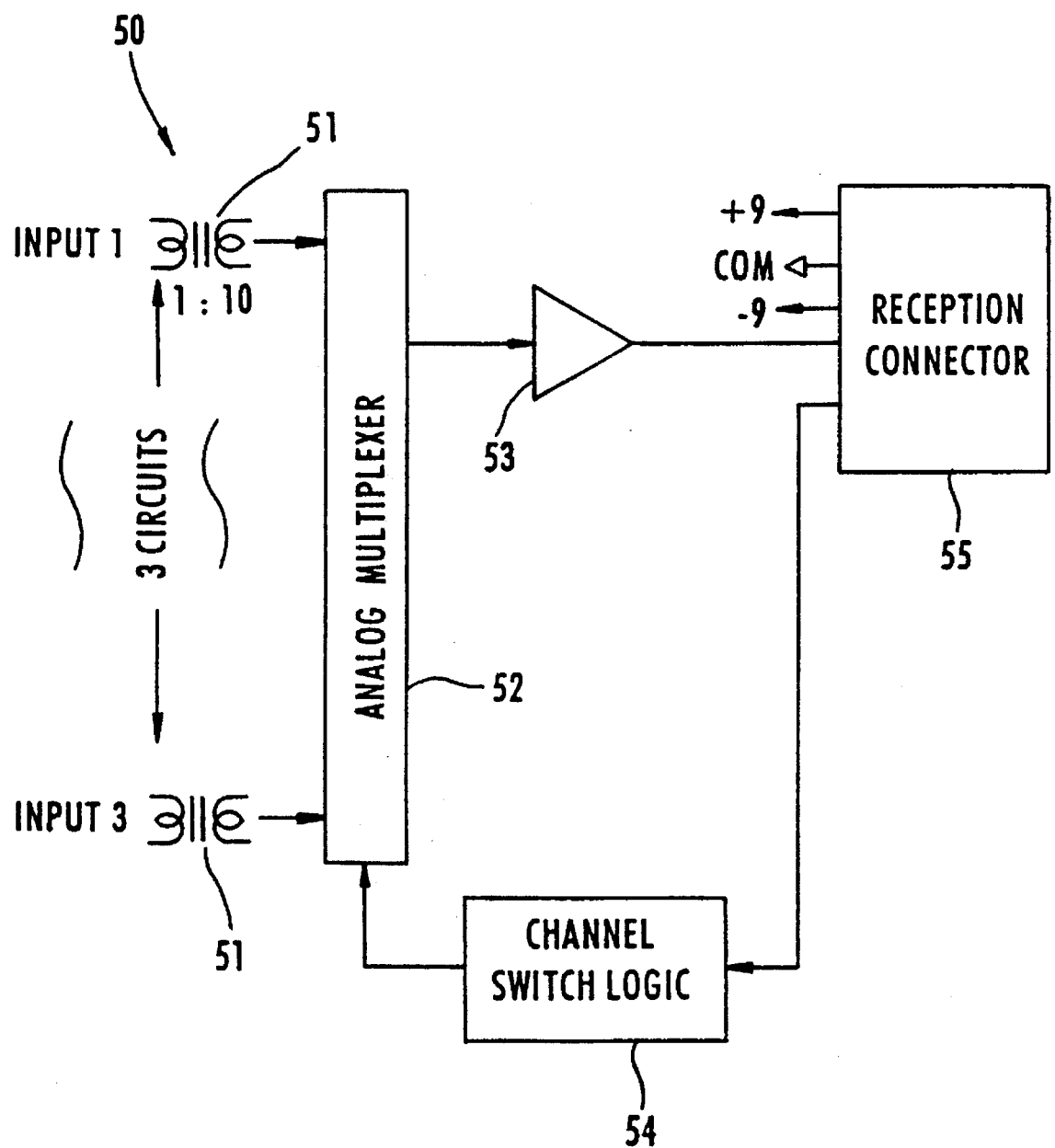
FIG. 16 is a block diagram of a reception circuit of the transmission/reception board used with second embodiment of the invention.

As shown in FIG. 16, the reception circuit 50 consists of a plurality of, concretely three CTs 51 connected to three reception lines 26 via a reception connector 67b, an analog multiplexer 52 connected to the CTs 51, an amplifier 53 and a channel switch logic 54 connected to the analog multiplexer 52, and a reception connector 55 connected to the amplifier 53 and the channel switch logic 54. Therefore, the reception circuit 50 is adapted to receive a signal from each reception line 26 via each CT 51.

The operation of the second embodiment is basically the same as that of the first embodiment in which no skip is executed, except that the loop is broken when three repetitions are made at step 96 in FIG. 11. That is, when the analog multiplexer 52 in the reception circuit 50 switches a signal from each reception line 26 every scanning period and completes the operation three times for the three reception lines 26, the analog multiplexer 44 in the transmission circuit 40 switches the current transmission line 22. Similar processing is repeated three times and sense data about sensing units 20a is registered in different addresses of a dual port RAM 76 in sequence in relation to the sensing units 20a.

Therefore, the information processor 30 can read the sense data stored in the dual port RAM 76 for judging a pinball exists at what time at what position (sensing unit 20a) under any desired retrieval conditions whenever necessary independently of the above-mentioned detection signal processing.

Thus, the information processor 30 can read the sense data recorded in the dual port RAM 76 by a read start signal, as required, perform operations on the read sense data, and compare the sense data with the pinball monitor data stored on the card 173 for monitoring pinballs.

In the pinball detection system, the transmission lines 22 and the reception lines 26 are disposed corresponding to the safe holes 14a on the base board 11 so that their intersections 20a become positions of the safe holes 14a, thus the number of the transmission lines 22 and the reception lines 26 to be scanned becomes the minimum number corresponding to the safe holes (in the example, each three lines), and the detection speed can be improved drastically while the important detection range is maintained.

Figure 17:
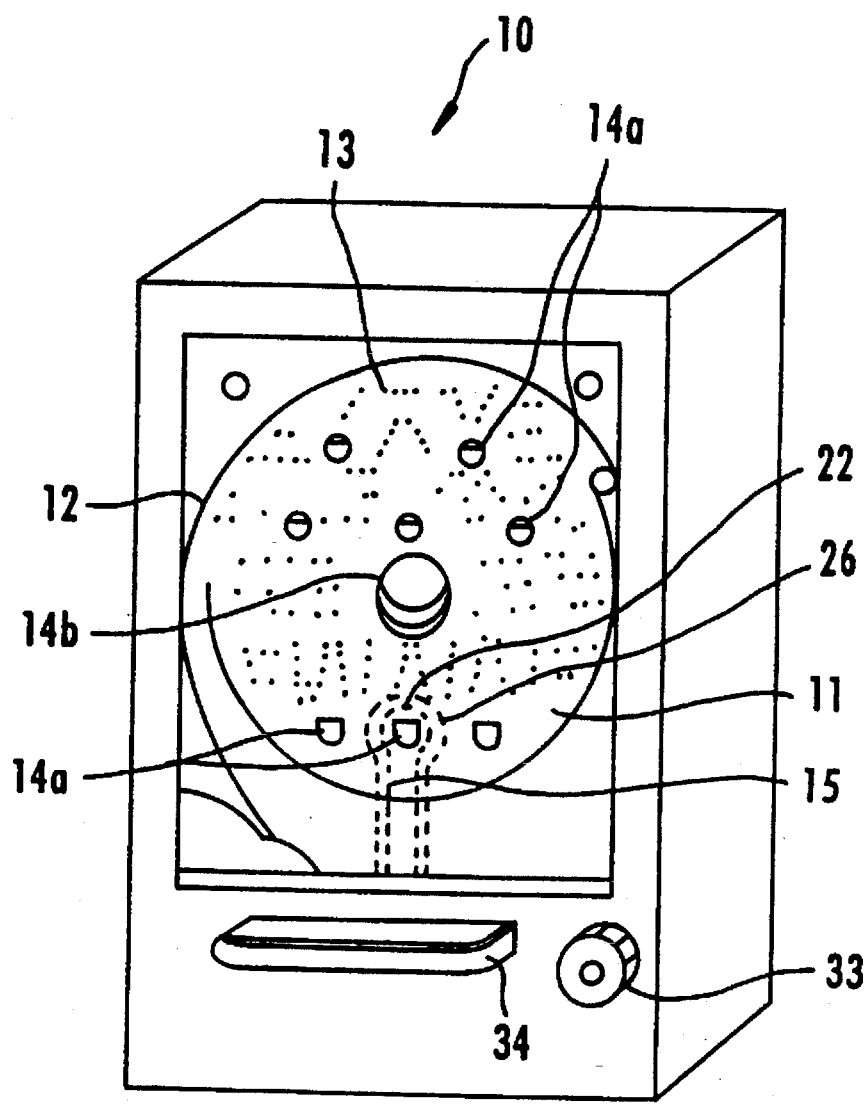
FIG. 17 is a perspective view showing an outline of a pinball machine showing a modified form of the second embodiment of the invention.

The locations and forms of the transmission and reception lines in the invention are not limited to those in the embodiments; for example, a pair of transmission and reception lines 22 and 26 may be provided paying attention to only one safe hole 14a, as shown in FIG. 17.

Next, a third embodiment of the invention will be discussed with reference to the accompanying drawings.

The third embodiment has a matrix sensor 20 and a signal processing system 170 which drives the matrix sensor 20, as shown in FIG. 6.

The third embodiment differs from the first embodiment in that it is provided with a data converter section 400 at the stage preceding an information processor 30 in the signal processing system 170. The data converter section 400 compares a reception signal from each reception line 26 with reference data for converting the signal into response data (difference data) representing a change in an induced current on the reception line 26 for decision in the information processor. Other configuration of the third embodiment is as the same as that of the first embodiment. The third embodiment can be applied to both a case where transmission lines 22 are not skipped and a case where transmission lines are skipped in the first embodiment. It can also be applied to the second embodiment.

The signal processing system 170 has a transmission/reception board 171 and a control board 172, as shown in FIG. 6.

Figure 18:
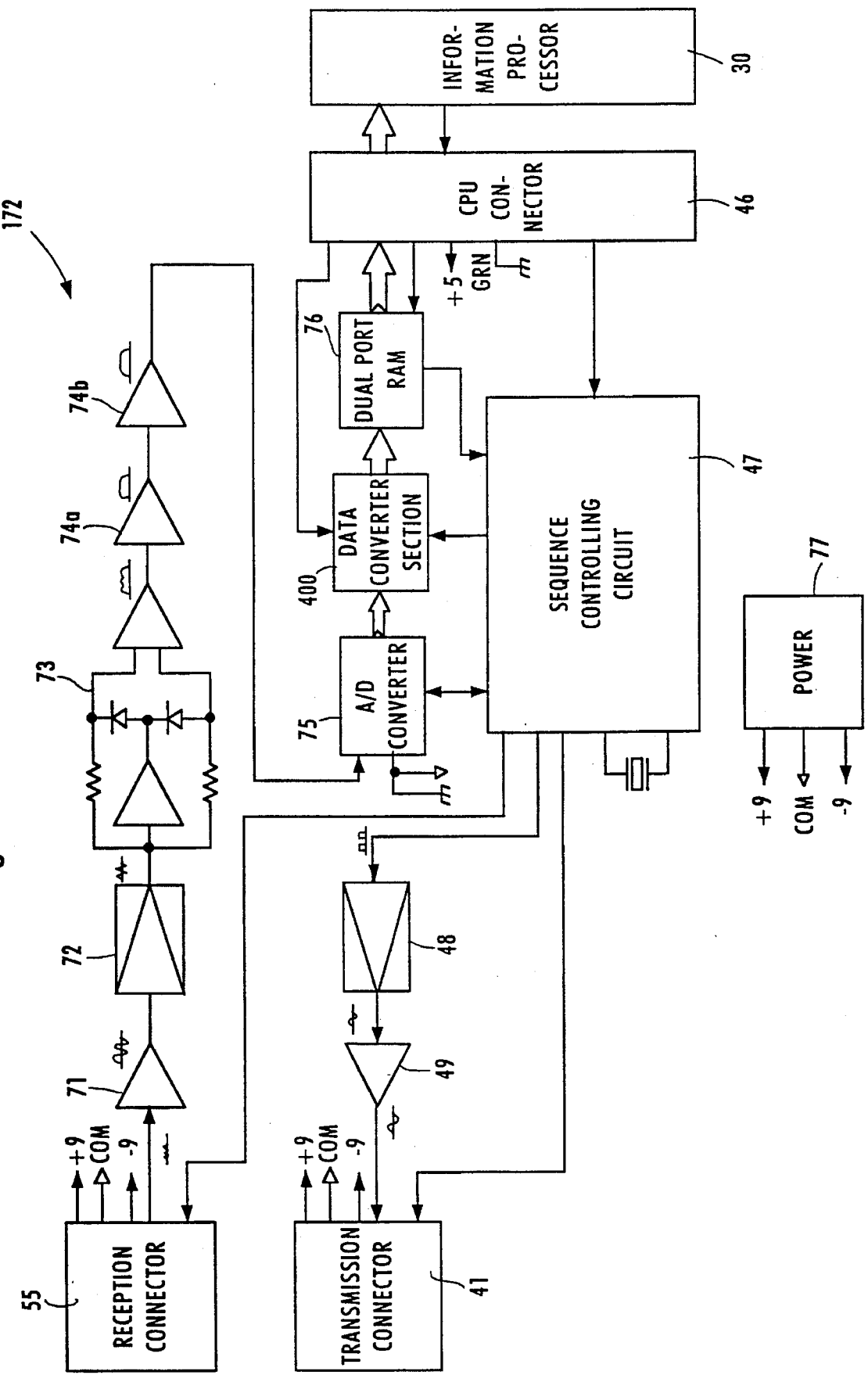
FIG. 18 is a block diagram showing the configuration of a control board to form a third embodiment of the invention.

The control board 172 has an information processor 30, as shown in FIG. 18. The control board 172 has a transmission section comprising a sequence controlling circuit 47 for sending a transmission clock in response to a start signal input from the information processor 30 via a CPU connector 46, a band-pass filter 48 for receiving the transmission clock and outputting a transmission signal, and an amplifier 49 for amplifying the transmission signal and sending the amplified signal to a transmission connector 41.

The control board 172 has a reception section comprising an amplifier 71 for amplifying a reception signal from the reception connector 55, a band-pass filter 72 for receiving the amplified signal, a full-wave rectification amplifier 73 for receiving the reception signal through the band-pass filter 72, two low-pass filters 74a and 74b for receiving the reception signal from the full-wave rectification amplifier 73, an A/D converter 75 for receiving the reception signal through the low-pass filter 74b, converting the reception signal into digital data under the control of the sequence controlling circuit 47, and outputting the digital data, data converter section 400 for receiving the digital data as raw data X and converting the raw data X into response data Z representing the presence or absence of an electro-magnetic characteristic change at each sensing position (presence or absence of a pinball), and a dual port RAM 76 for writing the response data Z under the control of the sequence controlling circuit 47 and sending the response data Z via the CPU connector 46 to the information processor 30 in response to a read signal from the CPU connector 46.

Figure 19:
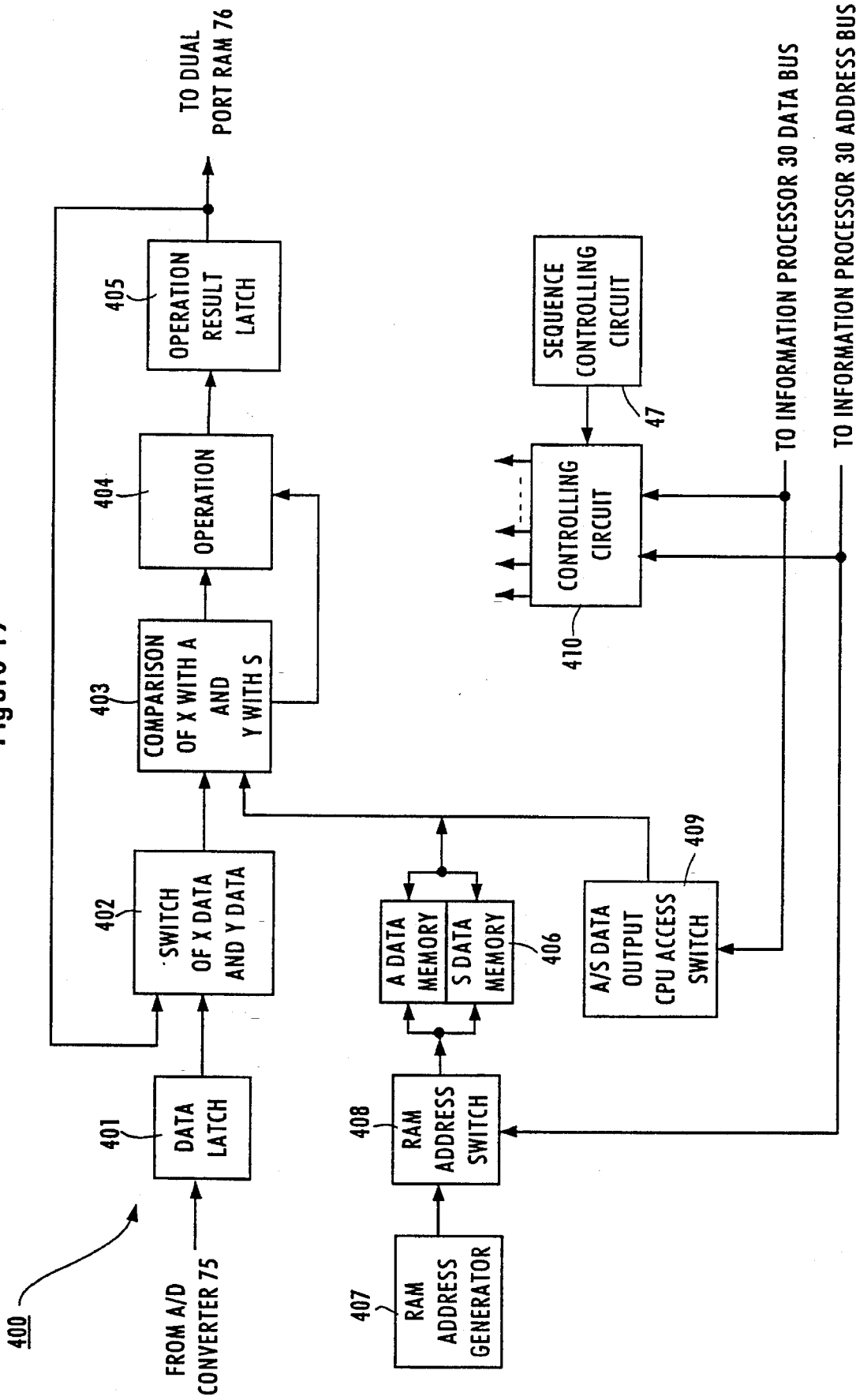
FIG. 19 is a block diagram showing a configuration example of a data converter section used in the third embodiment of the invention.

As shown in FIG. 19, the data converter section 400 comprises a data latch circuit 401, a data switch circuit 402, a comparator 403, an operational circuit 404, an operation result latch circuit 405, a reference memory 406, an address generating circuit 407, a RAM address switch circuit 408, a CPU access switch circuit 409, and a controlling circuit 410. The circuitry containing the memory can be provided by a one-chip IC. The data converter section 400 operates each time data about one sensing unit is obtained. At the time, the data converter section 400 has the two operation modes: The first is a mode of making a calculation from expression (1) described below and the second is a mode of making a calculation from expression (2) described below.

The data latch circuit 401 inputs an output of the A/D converter 75 on a scanning period of reception line 26 of the matrix sensor 20, for example, 28 μsec, and holds it until the next sampling period. In the description to follow, the data input by the data latch circuit 401 is represented as raw data X for convenience. There are as many pieces of raw data X as the number of sensing units 20a of the matrix sensor 20, for example, 1024.

The data switch circuit 402 selects either the data latched in the data latch circuit 401 or data latched in the operation result latch circuit 405 described below and sends the selected data to the comparator 403 at the following stage. The data switch circuit 402 selects raw data X in the first operation mode and outputs it to the comparator 403 and selects an output of the operation result latch circuit 405 in the second operation mode and outputs it to the comparator 403. The switch operation for the selection is performed so that the first and second operation modes are executed in order within each scanning period. The switch operation of the data switch circuit 402 is controlled by the controlling circuit 410.

The comparator 403 compares the output of the data switch circuit 402 with an output of the reference memory 406, generates a signal representing the size relationship between them, and outputs the signal to the operational circuit 404. Also, the comparator 403 outputs the outputs of the data switch circuit 402 and the reference memory 406 to the operational circuit 404 as they are.

When receiving the outputs of the data switch circuit 402 and the reference memory 406 from the comparator 403, the operational circuit 404 makes calculations in the first and second operation modes and outputs the results. As described above, the operational circuit 404 first makes a calculation from expression (1), then from expression (2) within the scanning period. In the calculation from expression (1), the operational circuit 404 receives the output signal of the comparison result of the comparator 403 as a conditional input and subtracts the smaller value from the greater value to find a difference therebetween as an absolute value, as described below.

$Y=|X-A|$ Expression (1)

$Z=Y-S$ Expression (2)

where A denotes offset data, which is raw data X in the absence of a pinball and corresponds to the reference data in the invention, S denotes slice data having a preset value to remove a ripple of the raw data X, and Y denotes change data containing the ripple.

The offset data A and the slice data S are previously found by an experiment, etc., and are stored in the memory 406. In the embodiment, the data is previously recorded on a card 173 and is transferred to the reference memory 406. Therefore, at starting, the signal processing system 170 reads the offset data A and the slice data S from the card 173 and stores the data in the reference memory 406.

In the embodiment, if the comparison result between Y and S in the comparator 403 is (Y<S), the operational circuit 404 sets Z to 0 in the calculation from expression (2). That is, when the difference data is less than the slice data, the operational circuit 404 outputs the same result as the absence of a metal substance even if a difference exists in the sensing unit.

The operation result latch circuit 405 holds an output of the operational circuit 404. The output of the operational circuit 404 is connected to the dual port RAM 76 and also to the data switch circuit 402 as the output part of the second input data.

The reference memory 406, which is made of a random access memory (RAM), stores the offset data A and the slice data S representing a ripple of the raw data X for each sensing unit 20a (detection position).

The address generating circuit 407 specifies the address of data output by the reference memory 406; it outputs addresses in sequence based on a clock signal from the controlling circuit 410. Specifically, the address circuit 407 specifies the address generating of data corresponding to the detection position at each scanning timing. That is, the address generating circuit 407 specifies first the address of offset data A, then the address of slice data S each time a sensing unit 20a is scanned so that the output of the reference memory 406 is switched as described above.

The RAM address switch circuit 408 and the CPU access switch circuit 409 enable the information processor 30 to access the reference memory 406 only at initialization described below. The RAM address switch circuit 408 is connected to an address bus of the information processor 30. The CPU access switch circuit 409 is connected to a data bus of the information processor 30. The switches are controlled by the controlling circuit 410 in response to a command from the information processor 30.

The controlling circuit 410 controls the operation of the data latch circuit 401, etc., based on a clock signal and control signal from the sequence controlling circuit 47. Also, the controlling circuit 410 controls RAM address switch, CPU access switch, etc., based on a control signal from the information processor 30.

The dual port RAM 76 stores the response data Z for each sensing unit 20a under the control of the sequence controlling circuit 47. That is, the response data Z output from the data converter section 400 is registered in an address of the dual port RAM 76 specified by a signal from the sequence controlling circuit 47.

The control board 172 has a power unit 77.

Figure 20:
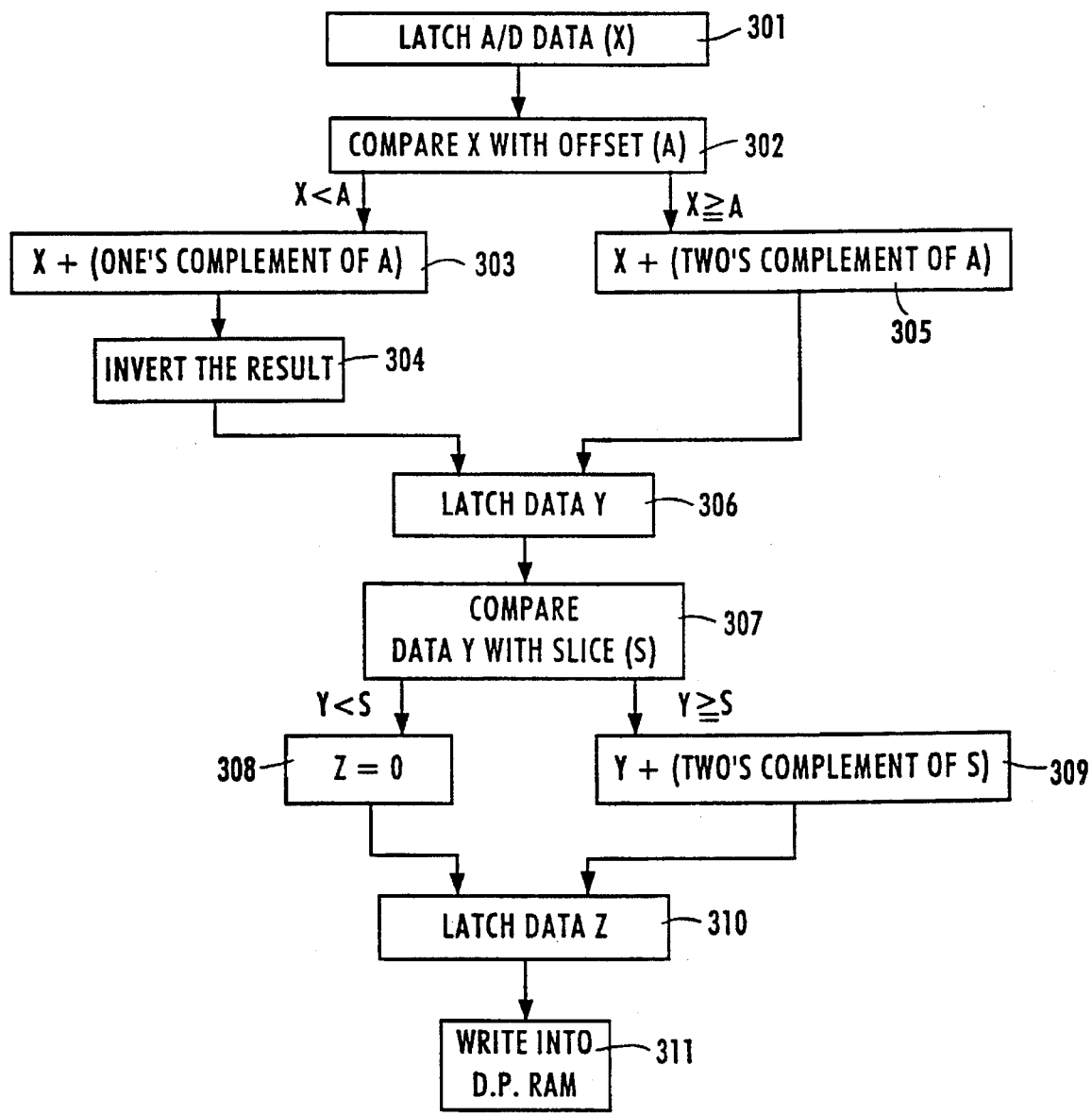
FIG. 20 is a flowchart showing a data conversion sequence in the third embodiment of the invention.

Next, the operation of the third embodiment will be described. The third embodiment is the same as the first and second embodiments in processing shown in the flowchart of FIG. 11 except that steps shown in FIG. 20 are executed between steps 93 and 94 in FIG. 11. Therefore, here a description is given centering around processing proper to the third embodiment. The embodiment assumes that transmission and reception lines are not skipped. It can also be applied to cases where the lines are skipped, needless to say.

Transmission of a signal current to each transmission line 22 of the matrix sensor 20 and reception of a signal from each reception line 26 are executed as in the first and second embodiments. The reception signal is sent to the A/D converter 75. The A/D converter 75 converts the signal from the reception line 26 into a digital signal in predetermined bit units, such as 12 bits, and outputs the resultant digital signal as raw data X to the data converter section 400 under the control of the sequence controlling circuit 47.

The data converter section 400 converts the raw data X into response data Z and outputs the response data Z to the dual port RAM 76 for registration. (For the process, see steps 301 to 311 in FIG. 20 and step 93 in FIG. 11.)

That is, the response data Z is recorded in the dual port RAM 76 in response to a write signal from the sequence controlling circuit 47 independently of the operation of the information processor 30. The address is incremented by one every scanning period based on the clock signal output by the sequence controlling circuit 47, for example, every clock. (See step 94 in FIG. 11). The dual port RAM 76 has a capacity of 3048 bytes, for example.

These steps are repeated every scanning period. That is, an analog multiplexer 52 in a reception circuit 50 switches the signal from each reception line 26 every scanning period (see step 95 in FIG. 11) and the above-mentioned operation is performed 32 times for the 32 reception lines 26 (one for each line) (see step 96 in FIG. 11). Upon completion of the operation, an analog multiplexer 44 in a transmission circuit 40 switches the current transmission line 22 (see step 97 in FIG. 11). Again, similar processing is repeated 32 times for storing the response data Z for each sensing unit 20a in different addresses of the dual port RAM 76 in sequence in relation to the sensing units 20a.

Therefore, the information processor 30 can read the response data Z stored in the dual port RAM 76 for judging a pinball exists at what time at what position (sensing unit 20a) under any desired retrieval conditions whenever necessary independently of the above-mentioned detection signal processing. That is, in the embodiment, the response data Z is found from Expressions (1) and (2) and therefore is set to 0 if no pinball exists. For this reason, it can be determined that a pinball exists at the detection position unless the response data Z is 0.

Thus, the information processor 30 can read the response data Z recorded in the dual port RAM 76 by a read start signal, as required, perform operations on the read response data Z, and compare the response data Z with the pinball monitor data stored on the card 173 for monitoring pinballs.

Next, the operation of the data converter section 400 will be described in detail.

The raw data X output from the converter 75 is input to the data latch circuit 401 for holding the data until the current detection position is switched to the next one after a lapse of the scanning period (step 301 in FIG. 20). The raw data X output from the data latch circuit 401 is selected as input data in the first operation mode by the data switch circuit 402, then is input to the comparator 403 on the scanning period.

At the time, the offset data A corresponding to the detection position of the raw data X output from the A/D data latch circuit 401 is output from the reference memory 406 to the comparator 403 in response to a command of the address generating circuit 407. The comparator 403 compares the offset data A with the raw data X at step 302. The comparison result is input to the operational circuit 404 and the offset data A and the raw data X are also input to the operational circuit 404 through the comparator 403.

The operational circuit 404 makes a calculation from Expression (1) according to the comparison result. When $X<A$, the operational circuit 404 adds one's complement of A to X and inverts the result, as shown at steps 303 and 304 in FIG. 20, for the calculation from expression (1); when $X \geq A$, the operational circuit 404 adds two's complement of A to X, as shown at step 305, for the calculation from Expression (1). The result, namely, change data Y is input to the operational result latch circuit 405 for holding the data until the next data is input (step 306).

Output of the reference memory 406 is switched to the corresponding slice data S in response to a command of the address generating circuit 407 at a predetermined timing after the calculation terminates in response to a timing signal from the controlling circuit 410, and output of the data switch circuit 402 is also switched to the second input, namely, change data Y output from the operation result latch circuit 405.

The comparator 403 compares Y with S at step 307 in FIG. 20, and the operational circuit 404 makes a calculation from Expression (2) based on the comparison result. When $Y<S$, the operational circuit 404 sets Z to 0, or when $Y \geq S$, adds two's complement of S to Y, as shown at steps 308 and 309, for the calculation from Expression (2).

The result, namely, response data Z is input to the operation result latch circuit 405 for holding the data until the scanning period terminates (step 310). The result held in the operation result latch circuit 405 is registered in the dual port RAM 76 at step 311, as described above.

The description assumes that offset data A and slice data S corresponding to 1024 detection positions are already registered in the reference memory 406. However, the embodiment is not limited to it. For example, when the pinball machine is not used, for example, is started, offset data A may be gotten by the pinball machine itself. When pinballs do not exist anywhere on the base board 11, the information processor 30 is instructed to perform initialization operation, and offset data A may be found under the control of the information processor 30, as described below:

First, the information processor 30 writes "0" into each of addresses of offset data A and slice data S in the reference memory 406 from the data bus through the CPU access switch circuit 409. Next, the information processor 30 outputs a start signal to the sequence controlling circuit 47 to perform the above-mentioned detection operation. Then, the response data Z about each detection position registered in the dual port RAM 76 becomes data in the absence of pinballs, namely, offset data A. At the termination of a series of scanning, the information processor 30 reads the data from the dual port RAM 76 and writes the data into the corresponding addresses of the reference memory 406.

In addition to writing of the offset data A, the information processor 30 writes preset slice data S into the corresponding addresses of the reference memory 406. The slice data S is a ripple of raw data X. Theoretically proper values are found from performance of the full-wave rectification and amplifier 73 or the low-pass filters 74a and 74b, etc.; they can be calculated at design or found by later experiments, etc. The slice data S may be predetermined and preset in a memory that can be accessed by the information processor 30, such as the card 173 in FIG. 6.

When the information processor 30 writes the data into the reference memory 406, data transfer or address specification is executed via the CPU access switch circuit 409 or the RAM address switch circuit 408. In contrast, at the normal detection operation other than the initialization, the CPU access switch circuit 409 or the RAM address switch circuit 408 performs the switch operation, so that the information processor 30 cannot access the data converter section 400; the information processor 30 has nothing to do with the operation of the data converter section 400.

Thus, the metal substance detection system of the embodiment, which finds response data Z indicating whether or not a pinball exists from raw data, can distinguish the data from background data and perform precise processing in sensing the presence or absence of a metal substance and determining the position thereof if present. In the embodiment, the response data Z can be found at high speed (order of nsec) because the data is found by the data converter section 400 consisting of logical circuitry disposed in the signal transfer channel preceding the dual port RAM rather than by the information processor 30.

In the embodiment, the comparator 403, the operational circuit 404, and the operation result latch circuit 405 are used for calculations from both Expressions (1) and (2) in the first and second operation modes by switching data by the data switch circuit 402. However, the invention is not limited to the configuration. For example, the comparator 403, the operational circuit 404, and the operation result latch circuit 405 may be provided corresponding to each expression calculation.

The response data Z can also be found by the information processor 30, in which case the signal processing system can be provided by the signal processing system 170 shown in FIG. 10. The processing performed by the data converter section 400 can be carried out by the information processor 30 which executes the processing procedure shown in FIG. 20. Here, the memory 406 can be provided by the main memory contained in the information processor 30.

The data converter section 400 can calculate the response data Z at higher speed than the information processor.

We claim:

1. A metal substance detection system comprising a matrix sensor having a detection area spreading like a plane and a signal processing system for driving the matrix sensor for detecting presence of a metal substance and a position thereof, said matrix sensor having a transmission line group consisting of parallel lines, a reception line group consisting of parallel lines, and a board for supporting the transmission and reception line groups, the transmission line group and the reception line group crossing each other with crossing portions of the transmission and reception lines being arranged in a matrix on the board, wherein the improvement comprises:

said signal processing system comprising:
a transmission circuit for scanning the transmission lines in sequence and sending a signal current to the transmission lines;
a reception circuit for scanning the reception lines in sequence and reading reception signals of the reception lines in sequence; and
a signal processor for controlling operation of said transmission circuit and said reception circuit and receiving a reception signal from said reception circuit for detecting presence or absence of a metal substance and a position at which the metal substance is sensed, said signal processor comprising:
an A/D converter for converting the reception signals input from the reception circuit into digital data;
a memory for storing the reception signals converted into the digital data in relation to intersections; and
an information processor for reading the reception signals stored in said memory for detecting presence or absence of a metal substance and a presence position thereof,
said memory being a dual port RAM (random access memory) into which data are written from said A/D converter independently of read operation and from which data are read from said information processor independently of the write operation.

2. The metal substance detection system as claimed in claim 1 wherein said signal processor further includes sequence control means for generating and outputting operation timing signals for controlling operation of said transmission and reception circuits, operation of said A/D converter, and for addressing the memory, said sequence control means generating scan control signals for scanning the transmission lines and the reception lines and outputting the signals to said transmission and reception circuits and to said memory.

3. The metal substance detection system as claimed in claim 2 wherein said signal processor further includes a removable storage medium and an interface section on which said storage medium is mounted, said storage medium storing information indicating the intersections to be monitored.

4. The metal substance detection system as claimed in claim 3 wherein when some of lines of either the transmission line group or the reception line group are previously specified as unscanned lines, said signal processor is responsive to the specification for outputting a signal for skipping the unscanned lines in scanning to either said transmission circuit or said reception circuit corresponding to the specification, and wherein said sequence control means is responsive to specification of unscanned lines for outputting a signal for skipping the unscanned lines in scanning to either said transmission circuit or said reception circuit corresponding to the specification.

5. The metal substance detection system as claimed in claim 4 wherein said sequence control means outputs a first timing signal to one of said transmission and reception circuits for scanning the lines in sequence and each time one scanning of the line group is complete, outputs a second timing signal to the other for switching the current scanning to the next line and the line group scanned in response to the second timing signal is specified as the unscanned lines.

6. The metal substance detection system as claimed in claim 5 wherein said sequence control means sends the first timing signal to said reception circuit and the second timing signal to said transmission circuit.

7. The metal substance detection system as claimed in claim 3 wherein said removable storage medium comprises a memory card.

8. The metal substance detection system as claimed in claim 6 wherein said storage medium stores scan information previously specifying unscanned lines, and wherein said signal processor has an information processor for reading scan information from said storage medium and setting the number of one or more contiguous lines to be skipped in scanning in said sequence control means.

9. The metal substance detection system as claimed in claim 8 wherein said sequence control means comprises:

a reception line switch pulse generating circuit for generating the first timing signal;

a transmission line switch pulse generating circuit for generating the second timing signal; and an interrupt timing circuit for dividing a first timing signal for generating an interrupt pulse having a pulse duration shorter than a period in which one scanning of the line group scanned in response to the first timing signal is complete.

10. The metal substance detection system as claimed in claim 9 wherein said information processor is synchronized with an interrupt pulse of said interrupt timing circuit before completion of one scanning of the line group scanned in response to the first timing signal for setting a skip count for the line to be scanned in response to a second timing signal and its subsequent lines in said sequence control means.

11. The metal substance detection system as claimed in claim 8 wherein the metal substance to be detected is loaded into a pinball machine and comprises a pinball moving a gaming area of the pinball machine, wherein said matrix sensor is mounted on a front of a base board of a pinball machine, each of the transmission lines is excited by signal current from said transmission circuit, and each of the reception lines detects a magnetic flux induced on the transmission lines intersecting the reception line, and wherein said storage medium stores information indicating a propelling position through which the pinball passes when it is propelled into the gaming area on the base board, positions of safe holes made on the base board, and a position of an out hole made on the base board as information indicating the intersections to be monitored.

12. The metal substance detection system as claimed in claim 3 wherein said signal processor further includes a data conversion section for comparing a reception signal with reference data and finding a change between said A/D converter and said memory.

13. The metal substance detection system as claimed in claim 12 wherein said data conversion section comprises a memory for storing the reference data and an operational circuit for finding a difference between the reference data stored in said memory and the reception signal from said reception circuit.

14. The metal substance detection system as claimed in claim 13 wherein said reference memory has an area for further storing the data having a predetermined width to remove the fluctuation contained in the reception signal, and wherein said operational circuit further subtracts the data having the predetermined width from the difference.

15. The metal substance detection system as claimed in claim 14 wherein said storage medium further stores the reference data and ripple data, and wherein said reference memory stores the reference data and the ripple data transferred from said storage medium.

16. The metal substance detection system as claimed in claim 14 wherein said data conversion means further includes operational means for subtracting data having a predetermined width to remove a fluctuation contained in the reception signal from the change.

17. The metal substance detection system as claimed in claim 15 wherein said data conversion means comprises a memory for storing the reference data and an operational circuit for finding a difference between the reference data stored in said memory and the reception signal from said reception circuit.

18. The metal substance detection system as claimed in claim 17 wherein said memory has an area for further storing the data having a predetermined width to remove the fluctuation contained in the reception signal, and wherein said operational circuit further subtracts the data having the predetermined width from the change.

19. The metal substance detection system as claimed in claim 18 wherein said operational circuit has means for making subtractions.

20. The metal substance detection system as claimed in claim 19 wherein said operational circuit contains a comparator for comparing data on which a subtraction operation is to be performed with respect to greater-than, equal-to, or less-than relation, and when comparing a reception signal from said reception circuit with the reference data to find a change, subtracts a smaller value from a greater value for outputting an absolute value of a difference therebetween.

21. The metal substance detection system as claimed in claim 20 wherein said operational circuit has a function of comparing the change with the data having the predetermined width, and when the former is smaller than the latter, setting the operation result to 0.

22. The metal substance detection system as claimed in claim 14 wherein when some of lines of either the transmission line group or the reception line group are previously specified as unscanned lines, said signal processor is responsive to the specification for outputting a signal for skipping the unscanned lines in scanning to either said transmission circuit or said reception circuit corresponding to the specification, and wherein said sequence control means is responsive to specification of unscanned lines for outputting a signal for skipping the unscanned lines in scanning to either said transmission circuit or said reception circuit corresponding to the specification.

23. The metal substance detection system as claimed in claim 22 wherein said sequence control means outputs a first timing signal to one of said transmission and reception circuits for scanning the lines in sequence and each time one scanning of the line group is complete, outputs a second timing signal to the other for switching the current scanning to the next line and the line group scanned in response to the second timing signal is specified as the unscanned lines.

24. The metal substance detection system as claimed in claim 23 wherein said sequence control means sends the first timing signal to said reception circuit and the second timing signal to said transmission circuit.

25. The metal substance detection system as claimed in claim 24 wherein said storage medium stores scan information previously specifying unscanned lines, and wherein said signal processor has an information processor for reading scan information from said storage medium and setting the number of one or more contiguous lines to be skipped in scanning in said sequence control means.

26. The metal substance detection system as claimed in claim 25 wherein each of the transmission lines is excited by signal current from said transmission circuit and each of the reception lines detects a magnetic flux induced on the transmission lines intersecting the reception line.

27. The metal substance detection system as claimed in claim 26 wherein the metal substance loaded into a pinball machine and to be detected is a pinball moving a gaming area of the pinball machine, and wherein said matrix sensor is mounted on a front of a base board of a pinball machine.

28. The metal substance detection system as claimed in claim 27 wherein said storage medium stores information indicating a propelling position through which the pinball passes when it is propelled into the gaming area on the base board, positions of safe holes made on the base board, and a position of an out hole made on the base board as information indicating the intersections to be monitored.

29. The metal substance detection system as claimed in claim 14 wherein said data conversion means for further includes operational means for subtracting data having a predetermined width to remove a fluctuation contained in the reception signal from the change.

30. The metal substance detection system as claimed in claim 15 wherein said data conversion means comprises a memory for storing the reference data and operational circuit for finding a difference between the reference data stored in said memory and the reception signal from said reception circuit.

31. The metal substance detection system as claimed in claim 30 wherein said memory has an area for further storing the data having a predetermined width to remove the fluctuation contained in the reception signal, and wherein said operational circuit further subtracts the data having the predetermined width from the change.

32. The metal substance detection system as claimed in claim 31 wherein said operational circuit has means for making subtractions.

33. The metal substance detection system as claimed in claim 32 wherein said operational circuit contains a comparator for comparing data on which subtraction operation is to be performed with respect to greater-than, equal-to, or less-than relation, and when comparing a reception signal from said reception circuit with the reference data to find a change, subtracts a smaller value from a greater value for outputting an absolute value of a difference therebetween.

34. The metal substance detection system as claimed in claim 33 wherein said operational circuit has a function of comparing the change with the data having the predetermined width, and when the former is smaller than the latter, setting the operation result to 0.

* * * * *